(12) United States Patent
McPherson

(10) Patent No.: US 10,526,228 B2
(45) Date of Patent: Jan. 7, 2020

(54) PROCESS AND APPARATUS FOR TREATING SLUDGE

(71) Applicant: ALI-JAK HOLDINGS PTY LTD, Queensland (AU)

(72) Inventor: Jason McPherson, Queensland (AU)

(73) Assignee: ALI-JAK HOLDINGS PTY LTD, Queensland (AU)

( * ) Notice: Subject to any disclaimer, the term of this patent is extended or adjusted under 35 U.S.C. 154(b) by 301 days.

(21) Appl. No.: 15/022,185

(22) PCT Filed: Sep. 18, 2014

(86) PCT No.: PCT/AU2014/000924
§ 371 (c)(1),
(2) Date: Mar. 15, 2016

(87) PCT Pub. No.: WO2015/039174
PCT Pub. Date: Mar. 26, 2015

(65) Prior Publication Data
US 2016/0229728 A1    Aug. 11, 2016

(30) Foreign Application Priority Data

Sep. 18, 2013  (AU) ................................ 2013903587
Oct. 25, 2013  (AU) ................................ 2013904134
Feb. 18, 2014  (AU) ................................ 2014100146

(51) Int. Cl.
*C02F 11/121*  (2019.01)
*B01D 1/00*   (2006.01)
(Continued)

(52) U.S. Cl.
CPC .......... *C02F 11/121* (2013.01); *B01D 1/0041* (2013.01); *B01D 1/20* (2013.01);
(Continued)

(58) Field of Classification Search
CPC ....... C02F 11/121; B01D 1/0041; B01D 1/20; B01D 5/00; B01D 5/006; F26B 17/02; F26B 17/04; F26B 21/06
See application file for complete search history.

(56) References Cited

U.S. PATENT DOCUMENTS

| 1,735,393 A | 11/1929 | Hiller |
| 3,997,406 A * | 12/1976 | Arvanitakis ............. B01D 1/00 159/2.2 |

(Continued)

FOREIGN PATENT DOCUMENTS

| CN | 202499498 U | 10/2012 |
| CN | 202764243 U | 3/2013 |

(Continued)

OTHER PUBLICATIONS

Subramanian, R.S. (date unknown). Mass Transfer Between a Sphere and an Unbounded Fluid, Department of Chemical and Biomolecular Engineering, Clarkson University, 5 pgs.*

(Continued)

*Primary Examiner* — Brian A McCaig
(74) *Attorney, Agent, or Firm* — Michael Best & Friedrich LLP

(57) ABSTRACT

An apparatus and process for removing moisture from sludge. The apparatus comprises a housing having an inlet and outlet for respective receipt and discharge of the sludge. A conveyor is located in the housing and is configured to transport the sludge from the inlet to the outlet. The apparatus further comprises a heater to heat the sludge to remove moisture therefrom whilst the sludge is being transported by the conveyor. The apparatus also comprises a vacuum pump arranged to extract air from the apparatus and, at the same time, to cause moisture removed from the sludge to flow therefrom together with the extracted air.

25 Claims, 11 Drawing Sheets

(51) Int. Cl.
  *B01D 1/20* (2006.01)
  *B01D 5/00* (2006.01)
  *F26B 17/02* (2006.01)
  *F26B 17/04* (2006.01)
  *F26B 21/06* (2006.01)
  *C02F 103/10* (2006.01)

(52) U.S. Cl.
  CPC ............ *B01D 5/006* (2013.01); *F26B 17/023* (2013.01); *F26B 17/04* (2013.01); *F26B 21/06* (2013.01); *C02F 2103/10* (2013.01)

(56) References Cited

U.S. PATENT DOCUMENTS

| | | | | |
|---|---|---|---|---|
| 4,184,955 | A | * | 1/1980 | Arvanitakis ....... B01D 21/0054 210/521 |
| 4,643,108 | A | * | 2/1987 | Singelyn ................. F26B 17/20 110/228 |
| 4,676,811 | A | * | 6/1987 | Wade ...................... B01D 47/06 96/262 |
| 4,913,771 | A | | 4/1990 | McIntyre |
| 5,186,840 | A | | 2/1993 | Christy et al. |
| 5,256,290 | A | * | 10/1993 | Becker ................... B01D 33/04 210/160 |
| 5,653,872 | A | | 8/1997 | Cohan |
| 6,892,471 | B2 | | 1/2005 | Ragnarsson |
| 7,310,892 | B1 | | 12/2007 | Cate et al. |
| 2005/0000108 | A1 | | 1/2005 | Ragnarsson |
| 2006/0088457 | A1 | * | 4/2006 | Kimura .............. B01D 11/0226 423/3 |
| 2008/0040842 | A1 | * | 2/2008 | Sanabria .............. A47K 13/307 4/213 |
| 2010/0170859 | A1 | | 7/2010 | Fout |
| 2015/0045215 | A1 | * | 2/2015 | Devine ................... C05F 17/00 504/101 |

FOREIGN PATENT DOCUMENTS

| | | |
|---|---|---|
| CN | 102305528 B | 10/2013 |
| JP | H05146603 | 6/1993 |
| JP | H0994566 | 4/1997 |
| JP | 2000246294 | 9/2000 |
| JP | 2002066598 | 3/2002 |
| JP | 2002273499 A | 9/2002 |
| JP | 2005331231 | 12/2005 |
| JP | 2006153376 | 6/2006 |
| WO | WO-9218214 A2 | 10/1992 |
| WO | 98/51139 A2 | 11/1998 |

OTHER PUBLICATIONS

Australian Patent Office Examination Report for Application No. 2014100146 dated May 21, 2014 (4 pages).
European Patent Office Search Report for Application No. 14846030.6 dated Aug. 10, 2016 (6 pages).
International Search Report and Written Opinion for Application No. PCT/AU2014/000924 dated Dec. 15, 2014 (8 pages).
International Preliminary Report on Patentability for Application No. PCT/AU2014/000924 dated Sep. 9, 2015 (96 pages).
Search Report issued by the European Patent Office for related Application No. 14846030.6 dated Nov. 19, 2018 (5 pages).
Second Examination Report issued by the Australian Patent Office for related Application No. 2014324079 dated Jan. 21, 2019 (4 pages).

* cited by examiner

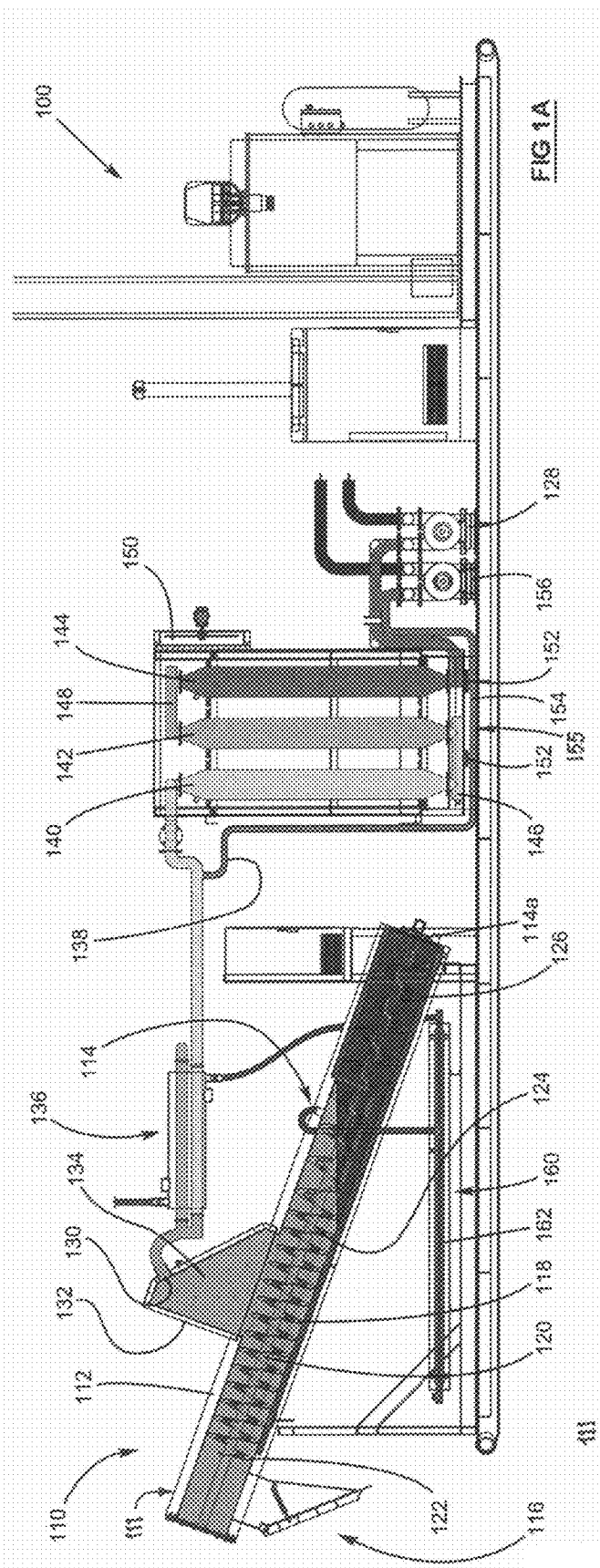

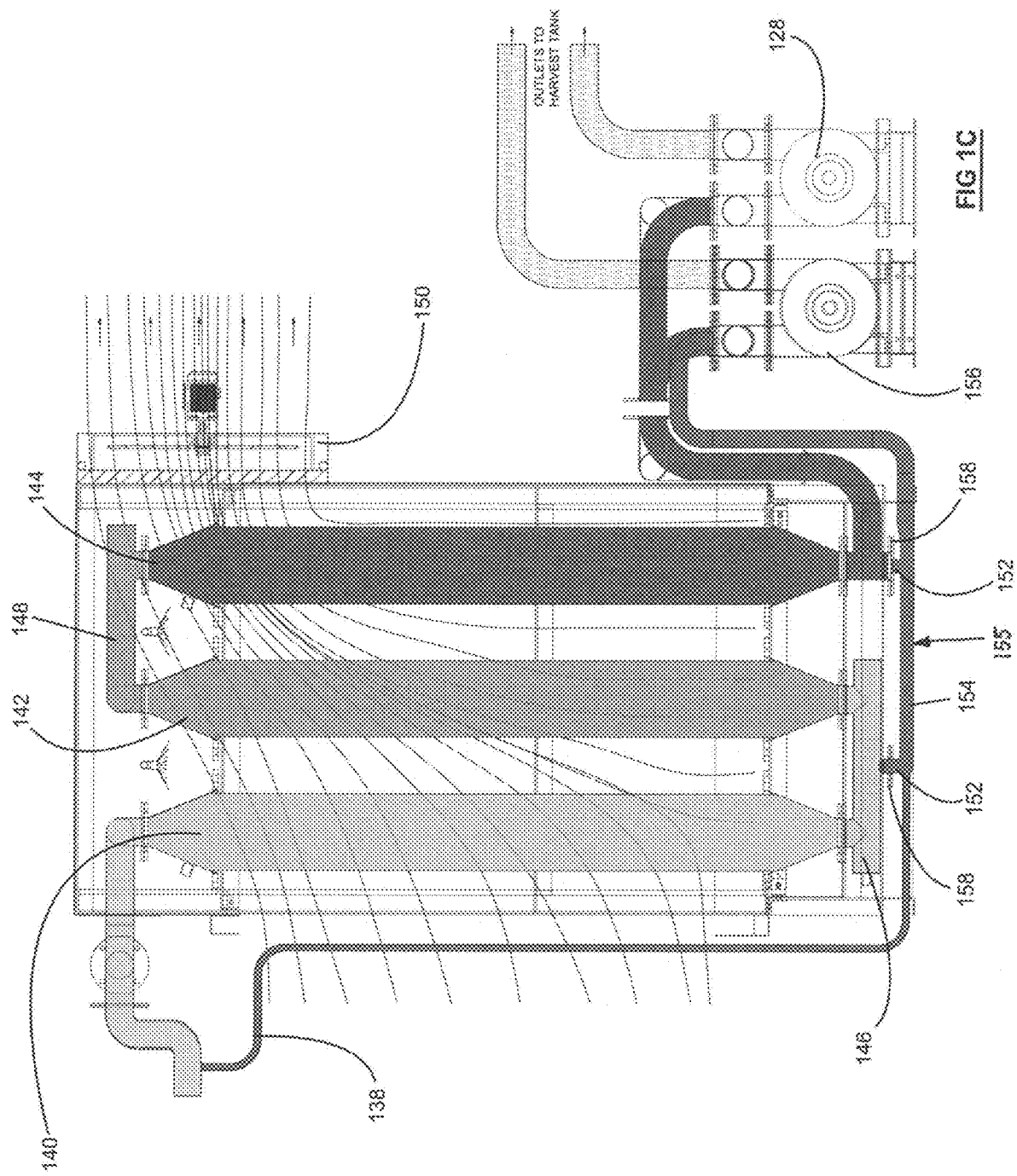

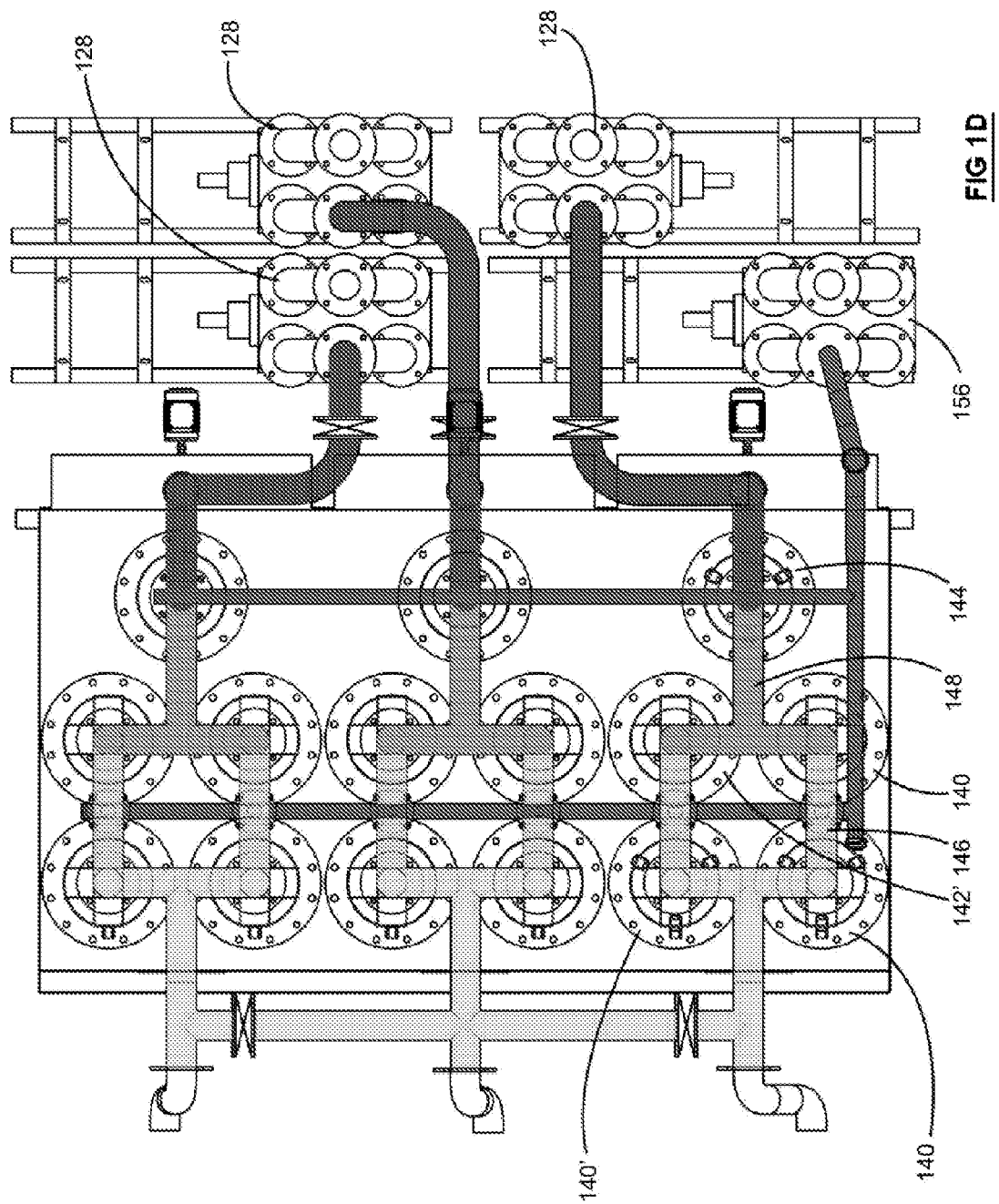

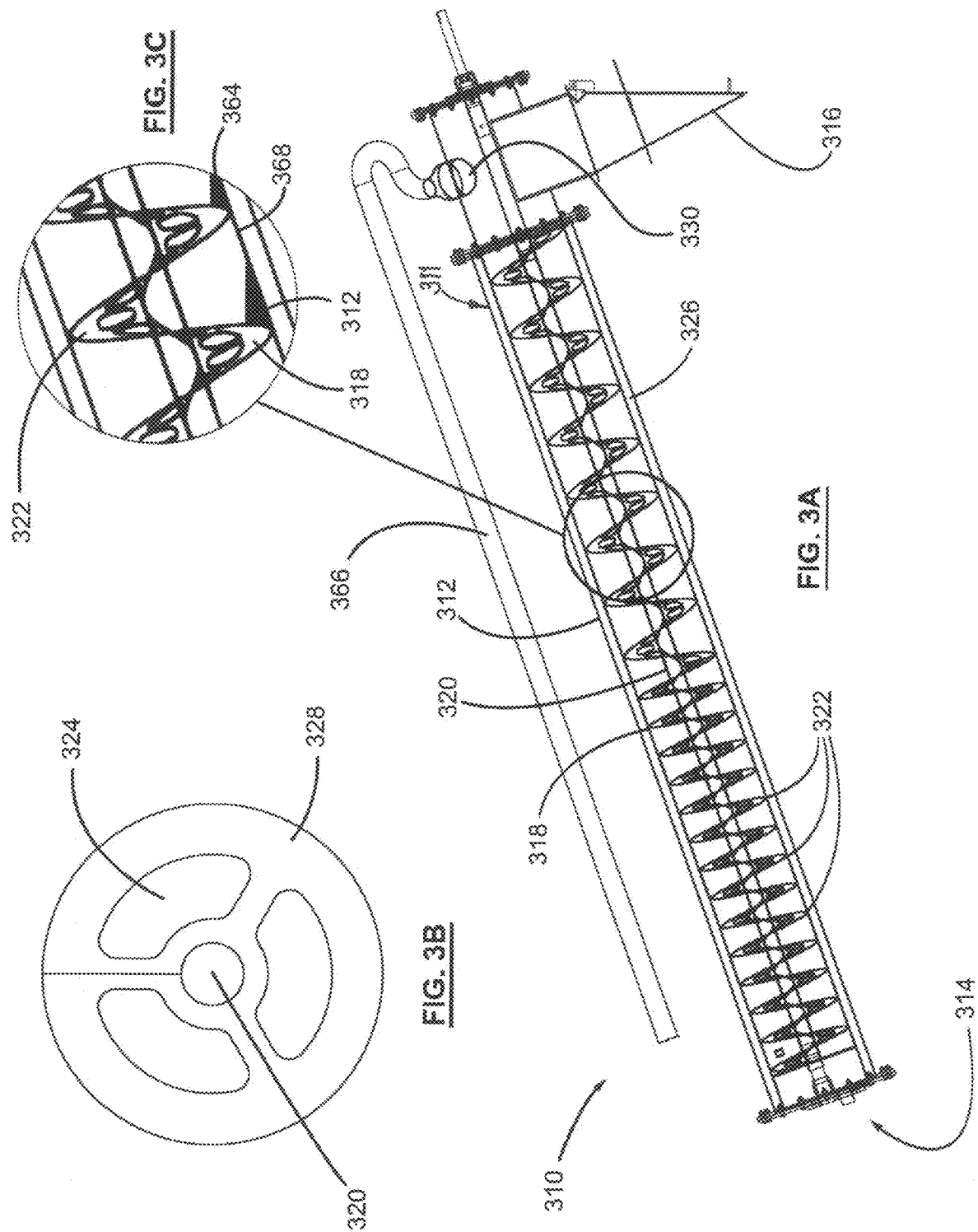

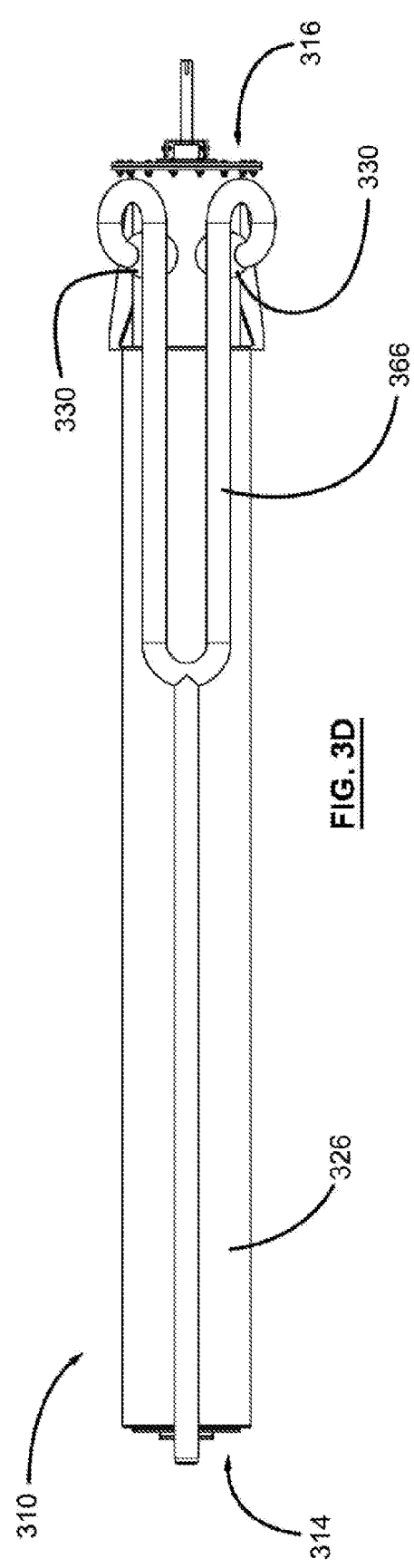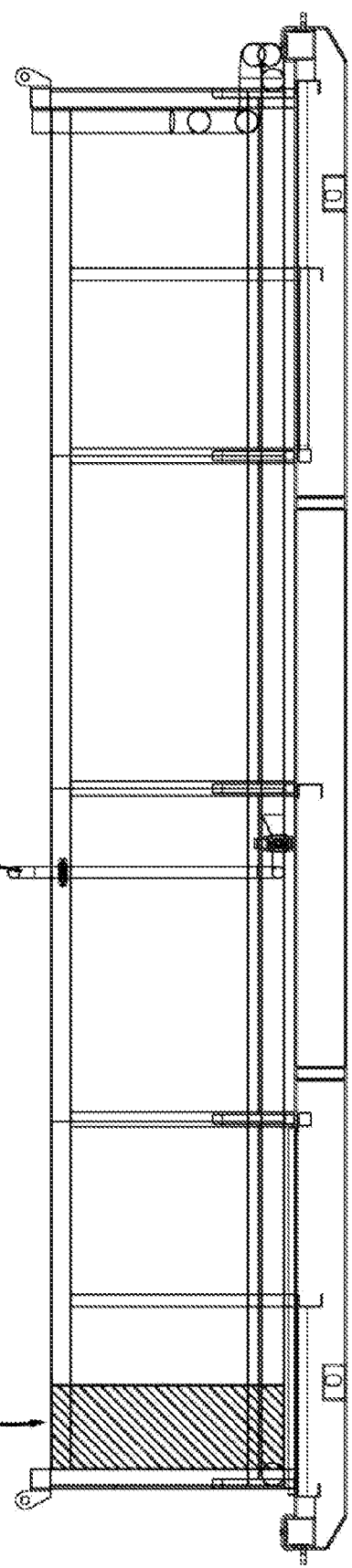

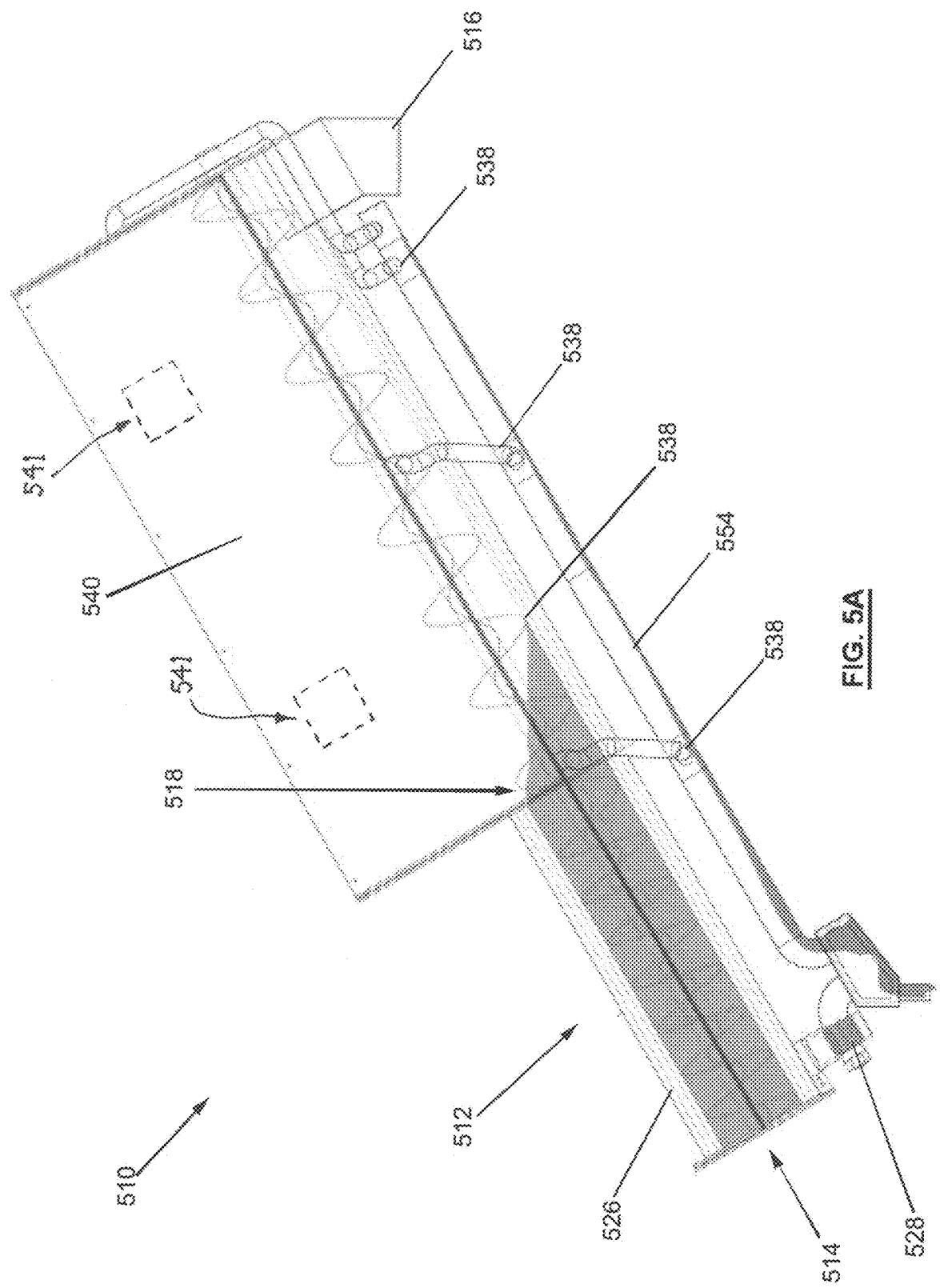

PROCESS AND APPARATUS FOR TREATING SLUDGE

TECHNICAL FIELD

Disclosed are an apparatus and process for the removal of moisture from sludge. The apparatus and process have particular, though not exclusive, application within the treatment of drill mud.

BACKGROUND ART

Sludge, made up of solids and liquid, is formed as a by-product of many processes used in a wide range of industries (e.g. mining, food processing, manufacturing, sewage treatment, etc.) Sludge may be treated at the same location where it is created or it may be transported to an alternative location for treatment or disposal. Environmental considerations and/or specialist sludge processing requirements often determine where and how the sludge is treated and disposed of.

One example of sludge that requires treatment is in the drilling industry, where drill muds are created as a by-product during and after the drilling process. Drill mud is often considered contaminated waste and must be processed prior to being re-integrated with the environment. In particular, this processing may comprise the removal of water in the drill mud.

Ordinary methods of separation, such as cyclonic separation, filtration, membranes or screens, are generally not suited for processing of drill mud to remove water. This is usually due to additives contained in the drill mud or the fine particle size of the sediments in the removed earth which, together with the water, act to block filters and resist separation. Thus, current methods of water removal for drill mud are mainly directed to settling processes, whereby the mud is stored in shallow ponds and water is allowed to evaporate naturally into the atmosphere.

Such methods require the construction of specialist environmental containment dams and specialist treatment facilities for any non-evaporative separation, or large areas of land for natural settling. These methods can be expensive due to the cost of constructing the pond, maintaining it during its lifetime and then reinstating the land to its original condition after the useful life of the pond. Ponds, in particular, face a further issue, whereby evaporation of liquid from the pond can increase the concentration of chemicals in the pond. Thus, for example, a pond (and the sludge contained therein) may be deemed to be at acceptable chemical concentration levels initially, but over time these levels may increase above acceptable levels due to evaporation. Such chemical concentration levels can have an adverse impact on the surrounding environment.

The above references to the background art do not constitute an admission that the art forms part of the common general knowledge of a person of ordinary skill in the art. The above references are also not intended to limit the application of the apparatus and process as disclosed herein.

SUMMARY OF THE DISCLOSURE

Disclosed herein is an apparatus and process for removing moisture from sludge. The apparatus and process find particular, though not exclusive, application in treating drill mud that has been created in drilling operations. However, the apparatus and process may also be suitable for many other applications; for example, the treatment of sewage, waste food, industrial waste, contaminated water, sea water, etc.

In a first aspect, there is disclosed a process for removing moisture from sludge. The process comprises the step of conveying the sludge on an incline through a housing, and heating the sludge as it is conveyed on the incline to evaporate moisture in the sludge.

In one embodiment, the sludge may be conveyed in the form of discrete accumulations. The discrete accumulations may be in the form of e.g. piles, lumps, collections, masses, etc. of sludge. It is not required that one accumulation be completely (i.e. 100%) separate from another as long as there is some gap between the accumulations or at least some partial separation of the accumulations of sludge (i.e. such that individual accumulations can be distinguished from one another).

That the sludge is conveyed in accumulations may promote heating and evaporation of the sludge e.g. by increasing the surface area of the sludge. The accumulations may be formed, for example, by use of a conveyor having flights. In such an arrangement the incline of the housing may be such that the sludge accumulates between each flight and the housing (i.e. the flights act as troughs). In this way, at any given time, a portion of the lower surface of the housing between each accumulation of sludge and the subsequent flight may be exposed (i.e. whereby the sludge does not cover this portion). This would tend not be the case when the housing and conveyor are horizontal (i.e. due to gravity sludge will completely cover the lowest surface). Because they are not covered by sludge, these exposed portions of the housing heat quickly (i.e. when compared to those portions which are covered). When on an incline, and the flights are moving, the accumulations of sludge are constantly pushed (i.e. by the flights) on to the hotter exposed portions of housing. This rapid increase in temperature (i.e. due to the contact with the exposed surface) causes the moisture in the sludge to rapidly evaporate.

Further, a leading edge of each trough of sludge can continuously come into contact with exposed housing. Because the leading edge is the shallowest part of the accumulation of sludge, it requires less energy to evaporate. This also facilitates rapid evaporation of moisture in the sludge.

In one embodiment a partial vacuum may be maintained in the housing whilst the sludge is conveyed therethrough. This may reduce the boiling point of the moisture contained in the sludge, thus reducing the temperature at which the sludge must be heated to in order to evaporate the moisture. This may reduce the heating energy requirements and increase the efficiency of the process. The partial vacuum may be maintained by a vacuum device, which may also extract evaporated moisture (e.g. in the form of a vapour) from the housing. In some arrangements, the vacuum may also assist movement of the sludge through or into the housing.

In one embodiment the conveying may be in the form of intermittent movement of the sludge. The intermittent movement may comprise a plurality of pause phases, in which the sludge is not moving, and a plurality of movement phases, in which the sludge is moving. Each pause phase may be for between 15 and 45 seconds. In other embodiments each pause phase may be for between 10 second and a minute. Each movement phase may be for between 3 and 10 seconds. In other embodiments each movement phase may be for between 2 and 30 seconds. The movement phase or pause phase may be followed by a reverse phase (where the direction of the movement is reversed). The reverse phase may be for between 2 and 10 seconds. When conveyed in accumulations, the intermittent movement of the sludge may facilitate heating of exposed portions of the housing (i.e. portions of the housing that are not covered by sludge). When the sludge is not moving (i.e. during a pause phase) the temperature of the exposed portions rapidly rises. Following this, the accumulations of sludge are conveyed onto the heated exposed portions and the heat is rapidly transferred to the sludge to cause moisture in the sludge to evaporate.

In one embodiment when the sludge is conveyed through the housing, it may be heated by indirect heat transfer through a wall of the housing from steam passed through a steam jacket that surrounds the housing.

In one embodiment the process may further comprise the step of passing the sludge through a nozzle to atomise the sludge prior to conveying it through the housing. This may increase the surface area of the sludge as it enters the housing and promote rapid evaporation of the moisture in the sludge.

In one embodiment the process may further comprise the step of collecting the evaporated moisture. The process may further comprise the step of condensing the collected evaporated moisture. The condensation of the moisture may be facilitated by cooled water that has been harvested from the sludge using the process. Collected evaporated moisture may also be passed through a heat exchanger to exchange heat with untreated sludge (i.e. entering the process). This can heat the sludge and cool the evaporated moisture to facilitate condensation of the evaporated moisture.

In one embodiment a portion of the collected moisture may be returned to a boiler to generate steam for heating the housing. In other words, the boiler and steam jacket arrangement may be replenished (i.e. with water) from the collected condensate, which may reduce the amount of external water that may need to be added to the boiler in use and can further improve the process efficiency. As set forth above, the collected condensate may have reduced levels (i.e. lower concentration) of salt or other substances when compared to the sludge). Thus, the collected condensate may alternatively or additionally be utilised as e.g. irrigation water, cooling water, industrial water, grey water or even drinking water.

In one embodiment the process may further comprise preheating the sludge prior to conveying it through the housing. The preheating may be performed using steam or exhaust gases from a boiler. In some cases the sludge may be preheated to boiling temperature (or close to boiling temperature) such that upon entry into the housing, moisture begins to evaporate from the sludge. This may be facilitated by a partial vacuum in the housing (i.e. which lowers the boiling point of the sludge).

In one embodiment the preheating may be performed as a generally isometric process such that the pressure of the sludge is increased by the preheating.

In one embodiment, following the preheating, the sludge may be driven into the housing by a differential pressure between the sludge and the interior of the housing.

In one embodiment the sludge may be intermittently introduced into the housing. The intermittent release of the sludge into the housing may correspond to intermittent movement of the sludge (by the conveyor), which may maintain a constant volume of sludge within the housing.

In one embodiment the angle of incline may be between 15 degrees and 30 degrees. The angle may, for example, be 22 degrees. If the incline angle is too large the sludge does not reach the end of the conveyor (i.e. it may roll/fall back along the conveyor). If the incline angle is too small then the sludge may reach the end of the conveyor and/or housing without all of the moisture being evaporated from the sludge (i.e. it may flow along the housing whether or not the conveyor is moving).

In one embodiment the sludge may comprise drill mud. In other forms, the sludge may be sewage, manufacturing waste, brine, mining residues, etc. A person skilled in the art would understand that the process for treating sludge could be used in various different applications to remove moisture from a mixture.

In one embodiment the moisture removed from the sludge may have a lower salt concentration than the sludge. The evaporation of the moisture in the sludge may allow the moisture to be separated from the salt.

In one embodiment the speed of the conveying of the sludge may be varied along the housing. For example, the sludge may be conveyed faster at e.g. an inlet of the housing compared to an outlet of the housing. This may be facilitated by variations in the spacing of flights of the conveyor.

In a second aspect there is disclosed an apparatus for removing moisture from sludge. The apparatus comprises a housing having an inlet and outlet for respective receipt and discharge of the sludge. The apparatus further comprises a conveyor located in the housing and configured to transport the sludge on an incline between the inlet and the outlet. The apparatus further comprises a heater to heat the sludge to remove moisture therefrom whilst the sludge is being transported by the conveyor on the incline.

In one embodiment the apparatus may further comprise a vacuum device arranged to extract air from the apparatus and, at the same time, to cause the moisture removed from the sludge to flow therefrom together with the extracted air.

The incline angle (e.g. of an elongate axis of the housing or of a conveyor therein) may be in the range of 10° to 30, or may for example be in the range of 20° to 25°.

The heating of the sludge causes the moisture in the sludge to evaporate, whereby the evaporated moisture can have reduced salt levels (i.e. lower concentration), when compared to the sludge. In some embodiments, the evaporated moisture may not contain any salt. The sludge may alternatively or additionally comprise other substances such as e.g. heavy metals, organic wastes, etc., which may not be present in the evaporated moisture (i.e. the substances may remain in the sludge when the moisture is evaporated). In other words, a range of elements and/or organics that may be present in the sludge, may not be present (or may be present at reduced concentrations) in the evaporated moisture. If, for example, this moisture is collected (e.g. having reduced levels of salt and/or other substances), it may be suitable for use as, for example, irrigation, cleaning (e.g. of drill mud delivery vehicles), cooling, dust suppression, constructions, stock watering, drinking water, re-use within the disclosed process, etc. In other words, the moisture that is evaporated and collected may not be any different from drinking water or water used in industrial processes and may therefore be suitable for any application in which water is used. Alternatively or additionally, the collected moisture may be blended with other drill mud (i.e. thereby watering such mud back down to a useable level), which may allow the other drill mud to be re-used. In other words, the moisture evaporated (and collected) from the sludge may be re-used in various ways, which may not be feasible with some other methods of treating sludge.

In some arrangements, the heat transferred to the sludge may be such that additives in the sludge are broken down.

In this respect, the sludge can, for example, become suitable for use in landfill, roads etc. The breaking down of the additives may be caused by the high temperatures experienced by the sludge when heated.

In one embodiment the vacuum device may further be arranged to apply a vacuum to an interior of the apparatus to lower the internal pressure therein. As set forth above, the lower internal pressure of the apparatus may reduce the boiling point of the sludge; thereby further facilitating evaporation of moisture from the sludge. The apparatus may be arranged so that there are multiple interior sections within the housing with varying pressure levels. These varying pressure levels may be consistent with differences in temperature across the apparatus. Such an arrangement may increase the rate of evaporation of moisture. The vacuum device may be a vacuum pump in fluid connection with the housing. Multiple vacuum pumps may be used.

In one embodiment at least an upper surface of the housing interior may be inclined and the outlet may be located at or adjacent to an upper most part of the housing. The inclined surface may facilitate flow of the evaporated moisture from the housing. As set forth above, due to the tendency of heated air to rise it will naturally flow towards the outlet (i.e. such that the evaporated moisture is essentially "guided" by the incline to a single point in the housing). In comparison, in configurations where the housing is horizontal, heated air will simply rise to the upper horizontal surface of the housing (i.e. assuming there is no other pump or fan to provide air flow, the latter introducing additional complexity into the setup).

In one embodiment the heater may comprise a steam jacket located to at least partially surround the housing so as to heat the sludge as it passes therethrough.

The steam jacket may fully or partially surround the housing. Configuring the steam jacket to fully surround the housing may help to ensure that heat is transferred evenly throughout the sludge, which may help to prevent localised hardening of the sludge in the housing. The heater may alternately comprise electric elements for transfer of heat to the sludge via radiation. A person of ordinary skill in the art would understand that other suitable means for heating the sludge may be used (e.g. infrared, microwave, etc.).

In one embodiment the steam jacket may comprise a first portion proximate to the inlet and a second portion proximate to the outlet. The first portion may provide a greater heat input per length of housing to the housing than the second portion. For example, the first portion may fully surround the housing and the second portion may partially surround the housing. Thus, when the sludge is at the first portion (e.g. a lower portion) of the housing, when it is likely to contain more moisture and be in greater volume, more heat may be transferred to the sludge.

In one embodiment the apparatus may further comprise a condenser in fluid communication with the housing to condense the moisture evaporated from the sludge and extracted from the housing. The apparatus may also comprise a heat exchanger to exchange heat between evaporated moisture and sludge prior to it entering the housing. Thus, the sludge entering the housing may be heated and the evaporated moisture may be cooled in order to facilitate condensing of the evaporated moisture.

In one embodiment wherein the condenser may comprise a plurality of condenser chambers arranged vertically. At least one condensate collection outlet may be located below the condenser chambers to collect condensate from the condenser chambers.

In one embodiment the apparatus may further comprise at least one condensate collection outlet for collection of the condensate from the condenser. The collection outlet may comprise a dedicated condensate harvest pump that removes condensate through the collection outlet.

In one embodiment the conveyor may comprise flights so as to be able to convey the sludge in discrete accumulations.

When the conveyor comprises flights, the incline of the housing may be such that sludge accumulates between each flight and the housing (i.e. the flights act as troughs). In this way, at any given time, a portion of the lower surface of the housing between each accumulation of sludge and the subsequent flight may be exposed (i.e. whereby the sludge does not cover this portion). This would tend not to be the case when the housing and conveyor are horizontal (i.e. due to gravity sludge will completely cover the lowest surface). Because they are not covered by sludge, these exposed portions of the housing heat quickly (i.e. when compared to those portions which are covered). When on an incline, and the flights are moving, the accumulations of sludge are constantly pushed (i.e. by the flights) on to the hotter exposed portions of housing. This rapid increase in temperature (i.e. due to the contact with the exposed surface) causes the moisture in the sludge to rapidly evaporate.

Further, it is the leading edge of each trough of sludge that continuously comes into contact with the exposed housing. Because the leading edge is the shallowest part of each accumulation of sludge, it requires less energy to evaporate, which may further facilitate the rapid evaporation of moisture in the sludge.

Similarly, arranging the housing on an incline may also facilitate flow of the evaporated moisture from the housing. Due to the tendency of heated air to rise, in use of the inclined housing, it will naturally flow towards the outlet (i.e. such that the evaporated moisture is essentially "guided" by the incline to a single point in the housing). In comparison, in configurations where the housing is horizontal, heated air will simply rise to the upper horizontal surface of the housing (i.e. assuming there is no other pump or fan to provide air flow, the latter introducing additional complexity into the setup).

The inlet may be such that it is located at the lower end of the housing. In this respect, the housing may be arranged such that the lower end of the housing, or a passage extending from the housing, is submerged in a trough, bucket, container etc. of sludge. In some forms, the inlet may simply be an open end of the housing. Alternatively, or additionally, the inlet may be such that at least a portion of the sludge is sprayed by passing it through one or more nozzles, into the housing. The one or more nozzles may be located in an outer surface of the housing (directed inwardly) or on the shaft of the screw conveyor (directed outwardly). Doing the latter may effectively increase the surface area of the sludge as it enters the housing, thereby increasing heat transfer to the sludge. In one form, the inlet may be located such that the sludge is sprayed into the area of the housing having a high or the highest temperature.

In one embodiment the conveyor may be a screw conveyor, and the flights may be formed between one or more blades of the screw conveyor. In other embodiments, the conveyor may be in the form of a conveyor belt or bucket conveyor. A person skilled in the art would understand that the conveyor may take other forms suitable for transporting sludge. A screw conveyor may provide continuous mixing (or agitation) of the sludge to allow for even heating of the sludge. The screw may also help to reduce the volume of hardened sludge that collects on the inner surfaces of the housing.

The or each blade of the screw conveyor can provide a further surface for transfer of heat to the sludge, thereby effectively increasing the total surface area for heat transfer. In use, the or each blade of the conveyor may not be completely submerged in the sludge. Thus, rotation of the or each blade means that portions of the blade fluctuate between being submerged and exposed to the air within the housing. When exposed to the hot air in the housing, each blade heats quicker than when submerged, thus increasing the transfer of heat to the sludge.

In one embodiment the flights of the screw conveyor may be variably spaced. The flights of the screw conveyor may be spaced more closely adjacent to the outlet, and may be spaced more widely adjacent to the inlet. The more flights the screw conveyor comprises, the larger the surface area of the sludge may be (i.e. due to an increase in the number of sludge accumulations). Thus, if the flights of the conveyor are spaced too wide then the total surface area of the sludge accumulations may not be maximised. On the other hand, if the flights of the screw conveyor are too close together, too much moisture may be removed from the sludge and it may become too hard to convey (i.e. it may form a concrete-like mixture). Similarly, if the sludge becomes too dry, it may form a dust, which may undesirable e.g. due to health and safety issues.

Sludge is transported more slowly at the portion of the conveyor having more closely spaced flights (and faster when then the flights are more widely spaced). In other words, such an arrangement allows for a variation in the speed of the sludge being conveyed along the length of the conveyor (i.e. even with the conveyor being rotated at a constant velocity). Thus, closer spaced flights may provide slower conveying of the sludge.

In one embodiment the housing may be substantially circular in cross-section and the screw conveyor may be sized so as to generally correspond to an internal diameter of the housing. The housing may, for example, comprise a pipe or tube having a major axis arranged on the incline. In this respect, the housing and steam jacket may form a concentric cylinder layout. This may provide a stronger, simpler and cheaper construction. It may also provide for easier transportation of the apparatus.

In one embodiment the blades of the screw conveyor may be configured to scrape sludge from an internal surface of the housing in use. Hardened sludge, or other material, may build up on the internal surfaces of the housing during use, which can reduce the heat transferred to the sludge from the heater. Scraping of the sludge from the internal surface by the blades may eliminate or reduce the need to periodically clean the housing. Thus, maintenance downtime (and costs) may be reduced. The conveyor may further comprise a piston for reciprocal motion of the conveyor along its longitudinal axis such that, when the piston is actuated, the blade(s) of the conveyor scrape the sides of the housing. Again, this may help to remove sludge that has dried and is attached to the inner surfaces of the housing. The rotational and reciprocal motions can be combined.

In one embodiment the one or more blades of the screw conveyor may comprise apertures to allow the flow of air along the housing. Thus, in use (i.e. when the or each blade of the screw conveyor is rotated) sludge may pass through the apertures and evaporated moisture (e.g. vapour) may rise up through the housing. When the screw conveyor is on an incline a portion of the sludge may pass backwards (i.e. opposite to the direction in which it is being conveyed) through the apertures of the or each blade, aided by gravity. This may promote mixing of the sludge, which may in turn facilitate evaporation of moisture from the sludge. Similarly this may also limit the volume of sludge located between each flight. In this respect, the size of the layer of sludge being evaporated may also be limited and thus "flash" evaporation may be promoted. The one or more apertures may have a teardrop form. In other forms the apertures may be circular, elongate triangular etc.

In one embodiment the screw conveyor may be driven by a variable speed drive. This may provide control of the speed of the conveying of the sludge (or further control when utilised in conjunction with variably spaced flights). The variable speed drive may also allow the direction of rotation of the screw conveyor to be reversed. In operation the screw conveyor can cause sludge to In one embodiment the apparatus may further comprise a counter-weighted door for the release of moisture-removed sludge from the apparatus.

In one embodiment the counter-weighted door may be arranged such that a partial vacuum may be able to be maintained in the housing in use. This may reduce the volume of air that must be extracted by the blower in order to maintain a partial vacuum in the housing, thereby reducing energy requirements.

In one embodiment the apparatus may further comprise an air inlet in a wall of the housing for enabling the flow of air into the housing, whereby a partial vacuum may be able to be maintained in the housing in use. The air inlet may be located proximate to the outlet of the housing.

In one embodiment the apparatus may further comprise a boiler to produce steam for the heater/steam jacket.

In one embodiment a portion of the moisture that is removed from the drill mud may be supplied to the boiler. In other words condensate may be separated from a condensate stream by e.g. a valve. In use, the boiler and steam jacket arrangement may experience some water losses. Making use of the condensate to replenish the boiler can increase the efficiency of the system and reduce water consumption.

In one embodiment the apparatus may further comprise a preheater to preheat the sludge prior to it passing into the housing inlet. The preheater may comprise at least one sealable preheat chamber to isometrically (i.e. at constant volume) preheat the sludge. In other words, heating the sludge inside at least one sealable chamber may cause the pressure of the sludge to increase. The preheater may comprise a plurality of sealable preheat chambers arranged in series to progressively raise the temperature and pressure of the sludge.

The apparatus may further comprise an inlet valve between the preheater and the housing inlet to regulate the flow of sludge from the preheater into the housing. In one embodiment the inlet valve may be configured to open intermittently so as to provide intermittent flow of sludge into the housing. The valve may help to maintain the vacuum in the housing. The vacuum may also be maintained by the sludge, which prevents a barrier to air entering the housing. As a result of this, and because the sludge may be generally incompressible, the vacuum in the housing may induce movement of the sludge into the housing. Thus, simply opening the valve may allow sludge to move from the heat exchanger to the housing without loss of vacuum (due to the incompressibility of the sludge).

In one embodiment the heat for the heat exchanger may be provided by exhaust gases or steam from the boiler.

In one embodiment the moisture removed from the sludge may have a lower salt concentration than the sludge.

In a third aspect there is disclosed a system for removing moisture from sludge. The system comprises an apparatus as defined above; and a controller for monitoring and adjusting one or more parameters in relation to the apparatus.

In one embodiment the one or more parameters may comprise at least one of: temperature, volume of collected moisture, rate of moisture collection, quality of collected moisture, volume of sludge released from the apparatus, consistency of the sludge, fuel usage and noise levels.

In one embodiment the system may be configured for performing the process as defined above in the first aspect.

In a fourth aspect there is disclosed a sludge treatment unit comprising a plurality of apparatuses as set forth above. Two or more of the plurality of apparatuses are in fluid connection with a single shared condenser for condensing evaporated moisture from the two or more apparatuses.

In one embodiment the plurality of apparatuses are arranged so as to be mountable to a single standard skid. The apparatuses may alternatively be truck-mounted.

In one embodiment the sludge treatment unit comprises four apparatuses.

BRIEF DESCRIPTION OF THE DRAWINGS

Notwithstanding any other forms which may fall within the scope of the apparatus and process as set forth in the Summary, specific embodiments will now be described, by way of example only, with reference to the accompanying drawings in which:

FIG. 1A shows a section view of a first embodiment of a sludge treatment unit as set forth in the Summary;

FIG. 1B shows a plan view of the treatment unit shown in FIG. 1A;

FIG. 1C shows an enlarged view of the condenser and pumps of the treatment unit shown in FIGS. 1A and 1C;

FIG. 1D shows a top view of the condenser and pumps shown in FIG. 1C;

FIG. 3A shows a section view of a third embodiment of the apparatus as set forth in the Summary;

FIG. 3B shows a section view of a conveyor of the apparatus of the third embodiment.

FIG. 3C shows an enlarged view of a portion of the apparatus of the third embodiment.

FIG. 3D shows a top view of the third embodiment.

FIG. 3E shows a side view of a further portion of the third embodiment.

FIG. 5A shows a section view of a fifth embodiment of the apparatus as set forth in the Summary;

DETAILED DESCRIPTION OF SPECIFIC EMBODIMENTS

Figure 2:
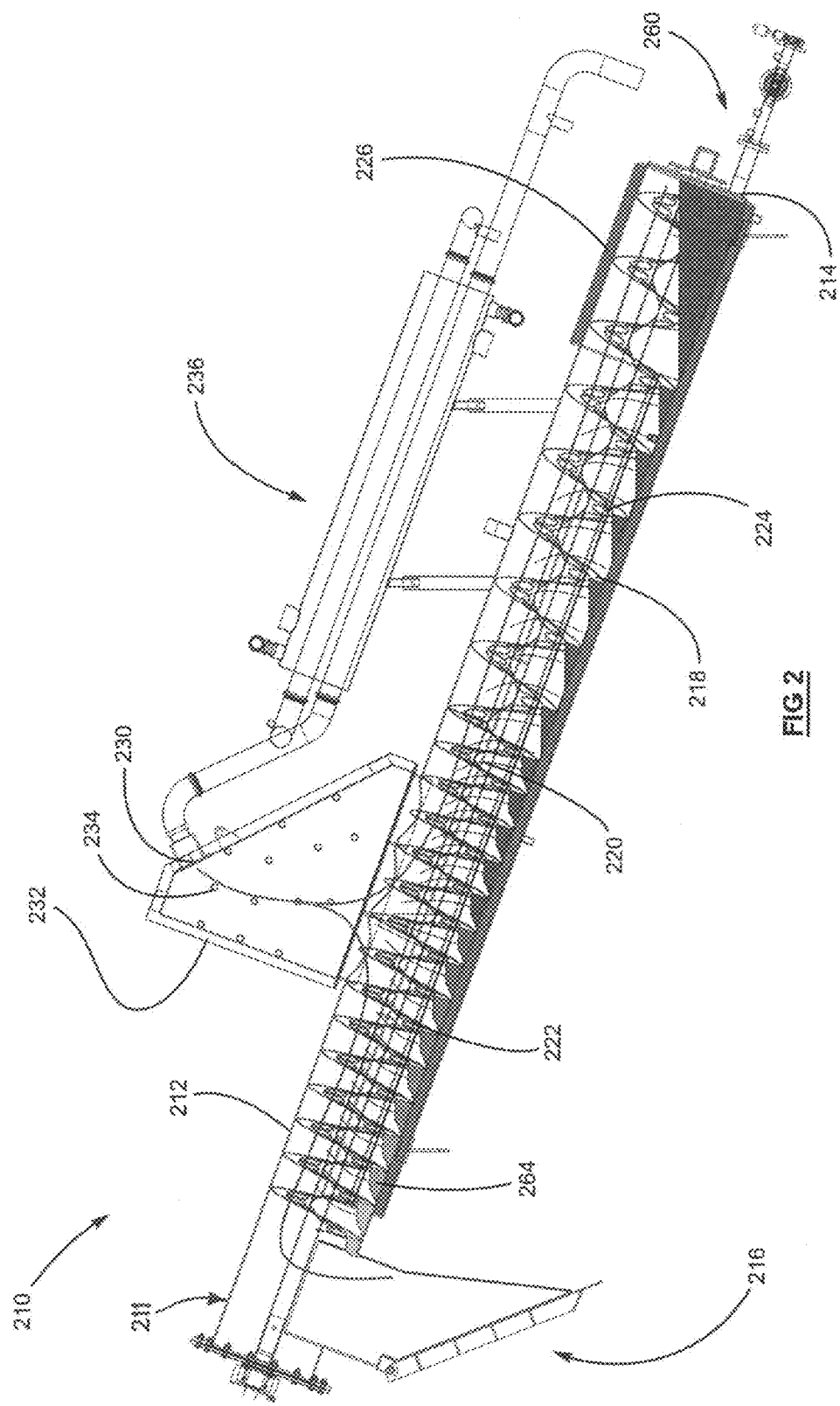
FIG. 2 shows a section view of an apparatus according to a second embodiment.

Referring to FIGS. 1A to D, a sludge treatment unit is shown comprising three substantially identical apparatuses 110 for removing moisture from sludge. In the illustrated form, the sludge is drill mud that has been created as a by-product of a drilling process and requires treating. However, the apparatus 110 is not limited to treating drill mud. The same apparatus 110 (or a modified version of the apparatus) may be used to process, for example, by-products from process plants, sewage, contaminated water, food waste (e.g. coffee grounds), slurry, recycled paper, etc. (i.e. generally any process where sludge requires treating). The term "sludge" is not intended to indicate a substance having any specific properties (e.g. viscosity). Rather, the term is used in a broad sense to define a substance (including e.g. contaminated water) containing a liquid that may be separated using the apparatus or process described herein.

A single apparatus 110 is described below, but all three apparatuses are substantially identical. The apparatus 110 comprises a housing 112 having an inlet, in the form of a nozzle 114, and an outlet, in the form of a discharge chute 116. The apparatus 110 comprises a secondary inlet 114a at its lower end. In the primary mode of operation for the illustrated apparatus 110, the secondary inlet 114a remains closed. However, in other modes of operation the secondary inlet 114a can be used exclusively or in combination with the nozzle 114, for example, dependent on the properties of the drill mud (or any other type of sludge being processed).

The nozzle 114 and discharge chute 116 are arranged for respective receipt and discharge of drill mud being treated by the apparatus 110. The apparatus 110 further comprises a ribbon screw conveyor 118, located in the housing 112 and configured to transport the drill mud on an incline from the nozzle 114 to the discharge chute 116.

The screw conveyor 118 comprises a hollow shaft 120 and a single helical blade 122 driven by a variable speed drive (not shown), which allows adjustment of the speed and direction of the rotation of the screw conveyor 118. In this way, the speed of conveyance of the drill mud can be optimised for efficient treatment (i.e. dependant on properties of the drill mud and the external environment). The ability to reverse the direction of the rotation of the screw conveyor 118 can facilitate mixing or agitation of the drill mud. It can also help reduce build-up of drill mud on a single side of the housing 112 (i.e. the drill mud can build-up towards one side of the housing 112 due to rotation of the screw conveyor 118). The reversal of the direction of the screw conveyor 118 can also push drill mud on to heated exposed portions of the housing 112. In other words, as the conveyor 118 rotates in a first direction it pushes drill mud to one side of the housing 112 and the other side of the housing 112 heats up; then when the conveyor 118 is reversed, it pushes the drill mud onto the exposed heated portion of the housing 112.

Rotation of the screw conveyor 118 agitates and mixes the drill mud, which allows heat to be more evenly distributed throughout the drill mud, and water to be more easily released or vapourised from the solids in the drill mud. Agitation of the drill mud also helps to prevent or reduce build-up of dried mud on the interior surface of the housing (which can reduce the heating efficiency of the apparatus).

The outer edge of the blade 122 of the screw conveyor 118 is generally circular in cross-section, such that it closely corresponds to the inner wall of the housing 112. In operation, the outer edge of the helical blade 122 acts as a scraper for scraping dried or deposited drill mud from the inner surfaces of the housing 112. In addition to the agitation of the drill mud, this also prevents the build-up of drill mud on the inner surfaces of the housing. Whilst not illustrated, the screw conveyor 118 can further comprise a piston or cam that is able to move the shaft 120 of the screw conveyor 118 reciprocally along its longitudinal axis. Such movement can allow further (e.g. back-and-forth) scraping of drill mud from the walls of the housing 112 by the outer edge of the blade 122 of the screw conveyor 118 (i.e. in addition to scraping provided by rotational movement of the screw conveyor 118). In some forms the screw conveyor 118 can be held in place by bearings at both ends, but in the illustrated embodiment it is arranged such that it is allowed to self-locate at the lower end of the housing 112. This can allow for simpler construction, which does not require a bearing assembled within the housing 112 at the lower end where it would, in use, be immersed in drill mud.

The screw conveyor 118 may be formed of stainless steel, galvanised carbon steel or another type of metal, or for example, may be of injection moulded plastic. A plastic conveyor may be lighter, cheaper, more resistant to heat and may allow for easier replacement (when compared with a metal screw conveyor). The conveyor can be treated with a surface treatment (e.g. coated, galvanised) that may, for example, increase its durability, corrosion resistance, etc.

The blade 122 of the screw conveyor 118 comprises tear-drop shaped (i.e. wider at the outer edge than the inner edge of the blade) apertures 124. These apertures 124 provide flow paths for air (and evaporated moisture carried in the air) that is extracted from the housing. The apertures 124 also allow drill mud to pass (e.g. flow) back along the housing 112 due to gravity and because the housing 112 is arranged on an incline. This helps to mix the drill mud, and can also limit the volume of drill mud that is contained between each flight of the screw conveyor 118. The teardrop shape of the apertures 124 helps to maximise their size (and therefore the flow of air and drill mud) while maintaining the structural integrity of the blade 122.

Although not apparent from the figures, the positioning of the apertures 124 in the blade is offset from flight to flight. Thus, as the air flows along the housing it is forced to take a longer (e.g. tortuous) path (i.e. compared to the direct path it would take if the apertures 124 were aligned). This can increase evaporation of the moisture in the drill mud.

The flights of the screw conveyor 118 are arranged so as to be variably spaced (i.e. along the length of the screw conveyor 118), whereby during operation the speed at which the drill mud is transported along the housing 112 varies. At the upper portion of the housing 112 (near the discharge chute 116) the flights are closer together and at the lower portion of the housing (near the nozzle 114) the flights are spaced further apart. In operation, if the screw conveyor 118 is moved (i.e. rotated) at a constant speed, then an accumulation of drill mud (between two flights of the conveyor 118) will be conveyed along the housing 112 faster at the lower portion (due to the larger spacing of flights) and slower at upper portion of the housing 112 (due to the narrower spacing of the flights). Thus, a variation in speed of the drill mud is provided without having to adjust the speed of rotation of the screw conveyor 118.

The screw conveyor is driven by motor via a gear box having a ratio that allows high torque and low speed rotation of the conveyor. However, the gear ratio can be adapted depending on the consistency of the drill mud or sludge being processed by the apparatus 110. As set forth above, the motor comprises a variable speed drive which may be controlled by a controller to vary the speed of rotation of the conveyor. The speed of rotation of the conveyor 118 can be adjusted depending on a range of factors including, for example, the viscosity of the drill mud.

A steam (i.e. heat) jacket 126, for heating the drill mud, is arranged so as to partially surround the housing 112. The steam jacket 126 comprises an internal void having steam flowing therethrough, in use. Heat from the steam passes through the walls of the housing 112 to heat the interior of the housing 112 and the drill mud. This causes moisture in the drill mud to increase in temperature to its boiling point, whereby it evaporates. The steam in the steam jacket 126 is supplied by a boiler (not shown).

The housing 112 and the screw conveyer 118 are arranged on an incline. The incline angle (i.e. of the housing 112 and/or screw conveyor 118 to level ground) is approximately 22 degrees in the illustrated embodiment. In other forms the incline may, for example, be in the range of 20 to 25 degrees, or 15 to 30 degrees. Similarly, the incline of the apparatus 110 may be adjustable. Due to the incline, drill mud accumulates between each flight of the screw conveyor 118 (i.e. the flights of the screw conveyor act as troughs). This is shown more clearly, for example, in FIGS. 2 and 3C. At any one time, a portion of the lower surface of the housing 112 between each accumulation of sludge and the subsequent flight is exposed (i.e. the sludge does not cover this portion). This would not be the case if the housing 112 and screw conveyor 118 were horizontal, because gravity would essentially level the drill mud, which would naturally cover the entirety of the lower surface of the housing 112 (rather than form discrete accumulations).

In operation, the screw conveyor 118 may be rotated intermittently. The conveyer 118 can be driven so as to repeatedly alternate between moving for a period of time (a movement phase) and stopping for a period of time (a stop phase). The pause phase allows the exposed surfaces to heat up such that during the movement phase the conveyor pushes the drill mud onto the heated exposed surfaces (so as to rapidly heat the drill mud and cause moisture in the drill mud to evaporate).

As the exposed portions of the housing 112 are not covered by, or in contact with, the drill mud, they heat quickly (i.e. when compared to those portions which are covered). Thus, in use, the accumulations of drill mud are pushed (i.e. by the moving flights of the conveyor 118) on to the hotter exposed portions of housing 112. As the accumulations of drill mud come into contact with the exposed portions of the housing 112, the large temperature differential causes a rapid transfer of heat from the housing 112 to the drill mud. This rapidly increases the temperature of the drill mud, thereby raising the temperature of the moisture contained therein above its boiling point such that the moisture rapidly evaporates (or "flashes" off). In essence, the effect that is produced by the combination of the incline of the housing 112 and the use of a flighted conveyor 118 can be described as being similar to water being thrown on to a hot barbeque plate (i.e. in that the water immediately evaporates as it comes into contact with the hot plate).

A further result of the arrangement of the illustrated embodiment is that the leading edge of each accumulation of drill mud that continuously comes into contact with the exposed portion of the housing 112. This leading edge is the shallowest part of each accumulation of drill mud (e.g. forming a thin filament of drill mud), and therefore requires less heat to evaporate (i.e. when compared to a deeper section of the accumulation). This further promotes rapid evaporation of the drill mud.

The steam jacket 126 extends substantially along the length of the inclined housing 112. At the lower portion of the housing 112 (i.e. adjacent to the nozzle 114), the steam jacket 126 extends around the entire circumference of the housing 112. For the remainder of the length of the housing 112 the steam jacket 126 only extends partway (i.e. the bottom half) around the circumference of the housing 112. Thus there is a large heat input (per length of housing 112) at the lower portion of the housing 112.

In general, and as is set forth above, during operation of the apparatus 110 wet drill mud tends to collect or pool at the lower end of the housing 112 (due to the incline). As portions of this wet drill mud are heated they are caused to dry and are conveyed by the conveyor 118 along the housing 112 in small (i.e. compared with the "pooled" drill mud) accumulations. In other words, the accumulations conveyed along the housing have smaller respective volumes than the collection or pool of drill mud located at the lower part of the housing 112. Thus, the arrangement of the steam jacket 126 as described above essentially provides more heat to the larger volume of wet drill mud than the smaller and drier accumulations of drill mud being conveyed by the conveyor 118. In use, the rotation of the screw conveyor 118 causes the drill mud to collect towards one side of the housing 112 (i.e. as it is "pushed" by the screw conveyor 118 to this side). In the present embodiment the steam jacket 126 generally extends around the bottom half of the housing 112. However, in other embodiments the steam jacket 126 may be offset around the housing to take into account the offset nature of the accumulated drill mud.

The apparatus 110 further comprises a vacuum pump 128 in fluid communication with the interior of the housing 112. In use, the vacuum pump 128 causes air to flow from the housing 112 and, at the same time, cause evaporated moisture to flow from the housing 112 (i.e. as water vapour). The vacuum pump 128 reduces the pressure in the housing 112, which in turn reduces the boiling point of moisture contained in the drill mud. This reduces the heat input required to evaporate the moisture in the drill mud. It also increases the rate at which the apparatus 110 is able to process the drill mud and the overall efficiency of the apparatus.

The moisture and air (e.g. vapour) is extracted by the vacuum pump 128 through an opening 130 in the housing 112. The opening 130 is located in a hood 132 having angled surfaces that guide the air to the opening 130. The hood 132 comprises spreader bars 134, which extend across the hood 132 and provide structural support to prevent the hood 132 from collapsing due to the vacuum created by the vacuum pump 128. The narrowing of the hood 132 (i.e. due to the angled surfaces) means that the velocity of the air (containing the evaporated moisture) increases from the point at which the hood joins the cylindrical portion of the housing to the opening 130. That the airflow is slower closer to the cylindrical portion (i.e. main body) of the housing 112 may help to limit the quantity of dust carried by the air flowing through the opening 130 and into the pipes (e.g. dust drops out of the air due to the lower velocity and is not carried through the opening).

The arrangement of the housing 112 on an incline also assists the flow of vapour from the housing 112. Due to the tendency of heated air to rise it will naturally flow towards the opening 130 located at the upper end of the housing 112. In other words the moisture that is evaporated along the length of the housing 112 is essentially "funnelled" by the inclined housing 112 (via the apertures 124 in the blade 122 of the conveyor 118) to the opening 130. A horizontal housing, for example, would not provide the same funnelling of heated air or vapour (i.e. assuming there is no pump or fan to provide air flow).

The hood 132 is positioned intermediate the ends of the housing 112 and closer to the upper end of the housing 112. Locating the opening 130 midway along the housing reduces the possibility of air holding moisture flowing across dry drill mud near the discharge chute 116 of the housing 112 (i.e. which could otherwise cause some of the moisture to be absorbed by the dry drill mud). The housing 112 further comprises an air inlet aperture 111 (in FIGS. 2, 3 & 4 this is respectively shown as air inlet 211, 311 & 411). The air inlet aperture 111 is located at the upper end of the housing 112, which allows outside air to enter the housing 112. This facilitates the flow of vapour and air in the apparatus 110 and also directs air in the upper portion of the housing 112 towards the opening 130.

An economiser heat exchanger 136 is located in proximity to the opening 130. After vapour exits the housing 112 through the opening 130, it passes through the heat exchanger 136. Drill mud from, for example, a tank (on-route to the nozzle 114 of the apparatus 110) also passes through the heat exchanger 136 and exchanges heat with the vapour. As the drill mud (at outside temperature) is generally cooler than the vapour (which has been heated in the housing 112) heat passes from the vapour to the drill mud, which cools the vapour. In other words, the vapour, when it at its hottest, transfers heat that would otherwise be lost to the drill mud, when it is at its coolest. The large temperature difference facilitates this transfer of heat and this heat exchange can improve the efficiency of the system. The heating of the mud reduces the energy that must be used in the apparatus to raise the mud to boiling point (e.g. such that less steam is required), while the cooling of the vapour helps to condense moisture in the vapour.

As the vapour cools, some of the moisture in the vapour condenses. In the heat exchanger 136 the pipes containing vapour (i.e. from the housing 112) are arranged so as to have several bends at various orientations. The bends are such that they increase the tortuosity of the path of the vapour, which increases the presence of turbulence in the airflow. This turbulence can help to facilitate condensation of the moisture in the vapour.

Condensation of the moisture is also facilitated by the differential temperature between the exposed portions of the housing 112 and the accumulations of drill mud between the flights of the conveyor 118. Vapour flows from the accumulations of drill mud and the exposed portions of the housing 112 (and conveyor 118) and this mixing of hotter and cooler air facilitates condensation of the moisture in the vapour. The vapour that condenses in the heat exchanger 136 collects (i.e. due to gravity) in a condensate collection pipe 138 that is positioned downstream from the heat exchanger 136.

Five condensers are also located downstream from the economiser heat exchanger 136 (and also downstream of the condensate collection pipe 138). The condensers are arranged in a two-two-one configuration. In other words, the vapour stream splits such that approximately half of the vapour passes through two condensers 140, 142 connected in series and the other half passes through two further condensers 140' 142' connected in series (and parallel to the first set of condensers 140, 142); before the streams re-join and all the remaining vapour passes through a final condenser 144. The condensers 140, 142, 144 are oriented vertically such that the vapour approximately follows a square-wave or serpentine path through the condensers 140, 142, 144 to the vacuum pump 128. That is, the first two condenser 140, 142 of each stream are connected at their lower portions by a first connection pipe 146 and the second condensers 142 and final condenser 144 are connected at their upper portions by a second connection pipe 148. Air is forced across the condensers by a fan 150 and they are also sprayed with water (which can be water previously harvested by the apparatus 110) in order to further cool and condense moisture in the vapour. Each condenser 140, 142, 144 also has a larger internal diameter than the pipe transferring the vapour to the condensers 140, 142, 144 from the heat exchanger 136. Thus, the pressure of the vapour decreases as it enters each first condenser 140, 140', which also facilitates condensation of the moisture in the vapour. The vertical orientation of each condenser 140, 142, 144 means that as moisture condenses it forms droplets that fall down the centre of the condenser 140, 142, 144 rather than forming on the sides of the condenser 140, 142, 144 (which would otherwise reduce the cooling efficiency of the condenser 140, 142, 144).

As moisture condenses in the first two condensers 140, 142 of each stream it collects in the first connection pipe 146, while condensate in the final condenser 144 collects at the bottom of the final condenser 144. The condenser arrangement comprises two condensate collection outlets 152; one located at the first connection pipe (of each stream) 146 and the other located at the bottom of the final condenser 144. Each condensate collection outlet 152 comprises a tube extending to a condensate collection header 154 under the condensers 140, 142, 144.

As set forth above (and as is clear from the figures), the treatment unit 100 of the illustrated embodiment comprises three substantial identical apparatuses 110. Each of these are arranged such that their condensate collection outlets 152 are connected to the (single) condensate collection header 154. The condensate collection header 154 is (fluidly) connected to a dedicated harvest vacuum pump 156 which causes collected condensate from all of the apparatuses 110 to flow from the header 154 (to be stored in a harvest tank). Each condensate collection outlet 152 also comprises an orifice plate 158 having an orifice that is sized to control the flow of condensate through the tube of the condensate collection outlet 152 and into the header 154. This control of flow, along with air inlets 155 located in the header 154, ensure that the dedicated harvest pump 156 does not overcome the other vacuum pumps 128 (i.e. for each of the three apparatuses 110) so as to cause vapour to flow into the header.

The collection pipes 138 of each apparatus (collecting condensate formed by the economiser heat exchanger 136) also connect to the condensate collection header 154 so that this condensate can also be extracted by the dedicated harvest pump 156. Although not shown in the Figure, valves may be used to control the flow of condensate into each collection pipe 138 to prevent vapour from passing into the collection pipe 138 (i.e. that should instead flow to the condensers 140, 142, 144 for condensing).

The moisture that is harvested by apparatuses 110 can have a lower salt concentration than the drill mud (i.e. the salt is left behind in the drill mud when the moisture evaporates). Alternatively or additionally, the harvested moisture may have a lower concentration of other substances that are present in the drill mud. In this respect, the moisture may be suitable for use as e.g. irrigation water, cooling fluid, etc. (i.e. when collected). Similarly, in some embodiments, the transfer of heat to the drill mud may be such that some, or all, of the additives in the drill mud are broken down (e.g. organic materials may decompose, react, sublimate, burn, etc. into simpler molecules). In this respect, the drill mud can, for example, become suitable for use in landfill, roads, soil conditioning etc.

The closed nature of the system can partially contribute to the efficiency of the system. As the moisture condenses in the condensers 140, 142, 144, and other parts of the system (e.g. the economiser heat exchanger 136), it causes the pressure of the system to decrease. In other words, the system inherently increases the vacuum, whereby the vacuum pumps effectively act as booster pumps that assist the system in maintaining this vacuum. As discussed above, this can increase the efficiency of the system.

Returning now to the housing 112 of the apparatus 110, the nozzle 114 is located in an upper surface of the housing 112 (directed inwardly) and towards the lower end of the housing 112. The nozzle 114 is in fluid communication with a preheater 160 that comprises several preheat chambers 162 arranged in series. The preheater 160 is in turn connected by pipe (upstream) to a tank containing untreated drill mud (to be processed by the apparatus 110). As set forth above, mud passing from the tank to the preheater 160 passes through the economiser heat exchanger 136, which helps to cool and condense moisture in the vapour extracted from the housing 112 and at the same time heat the mud prior to entry into the preheater 160.

The preheat chambers 162 are arranged in a (square) serpentine configuration and are separated by valves which can be used to control the flow of mud into the preheater 160, between the preheat chambers 162, and through the nozzle 114 in the housing 112. Steam from the boiler is passed to the preheat chambers 162 which heats the drill mud contained therein (i.e. through the walls of the preheat chambers 162). As the drill mud in each chamber 162 is heated, its pressure rises due to the mud being held in the preheat chamber 162 by the valves (i.e. this is essentially an isometric process). Once the drill mud is in the final chamber 162 (i.e. that closest to the nozzle 114), a controller opens the final valve between the chamber 162 and the nozzle 114. The large pressure differential between the interior of the housing 112 (under vacuum) and the drill mud causes rapid release of the drill mud in the final chamber 162 through the nozzle 114 and into the interior of the housing 112. Due to the velocity and temperature of the drill mud, and the expansion effect of the nozzle 114, the drill mud rapidly atomises (i.e. almost instantly) as it enters the interior of the housing 112, which causes a substantial portion (in some cases, all) of the moisture contained in the drill mud to evaporate (i.e. even before it comes into contact with any surface in the housing 112).

As the drill mud in the final chamber 162 is released by the valve, the valves of the other chambers are opened sequentially such that drill mud in one chamber 162 is transferred to a successive chamber 162. In this way, the pressure and temperature of the drill mud increases as it is moved to each successive chamber 162 (i.e. along the preheater 160 towards the housing 112).

Once the drill mud enters the housing 112 it is conveyed by the conveyor 118 (e.g. intermittently) towards the discharge chute 116 located at the upper outlet end of the conveyor 118 for discharge of treated drill mud from the housing 112. The chute 116 comprises a counter-weighted drop-out door, which only opens once the weight of the drill mud is sufficient to open the door. The chute 116 is designed so as to have sufficient volume for drill mud to collect therein for several hours (i.e. without the need to open the door). For example, the door may only need to be opened once every 6 to 8 hours. In other embodiments the discharge chute 116 may, for example, comprise a mechanically operated door. When shut, the door seals the housing 112 from the atmosphere, thereby helping to maintain a constant (below atmosphere) air pressure in the housing 112. Drill mud that is discharged from the housing 112 may be collected in a collection bin or bag (not shown). Alternatively, the drill mud may, for example, collect on a further conveyor, in the back of a truck, etc.

Referring now to FIG. 2, the apparatus 210 is predominantly the same as that shown in FIGS. 1A to 1D except for the arrangement of the inlet 214 and preheater 260.

The inlet 214, in the form of an opening, is located at approximately the lowest point of the housing 212 and comprises an inlet valve that regulates the flow of drill mud passing into the housing 212. When the valve is open, drill mud is essentially pulled into to the housing 212 by the vacuum. A controller may communicate with the valve to open and close the valve based on the speed of the conveyer 218 (e.g. to maintain a constant mass or volume of drill mud in the housing 212). For example, when the conveyor 218 is controlled so as to move intermittently, the valve may also be controlled to move intermittently (i.e. in phase with, or out of phase with, the conveyor 212).

A preheater 260 in the form of a tube heated by steam from the boiler is located in fluid communication with the inlet 214, such that the inlet valve forms a barrier (when closed) between the preheater 260 and the interior of the housing 212. Drill mud may pass from a drill mud tank into the preheater 260 at a temperature of e.g. 20° C. to 40° C. This drill mud is heated by the preheater to e.g. 60° C. prior to entering the housing. In some cases, the preheater 260 can be configured such that the drill mud is almost at (or is at) boiling point as it enters the housing 212 (i.e. facilitated by the vacuum in the housing 212).

The drill mud that enters the housing 212 generally pools at the lower end of the housing 212 (adjacent the inlet 214). The drill mud is then conveyed by e.g. intermittent movement of the screw conveyor 218 in discrete accumulations 264 formed between the flights of the screw conveyor 218. The volume of drill mud that accumulates between each flight is generally controlled by the size of the apertures 224 in the blade 222 of the conveyor 218 and the extent of the incline of the conveyor 218 and housing 212. As discussed above with reference to FIGS. 1A to D each accumulation 264 only covers a portion of the inner surface of the housing 212 between each flight such that a portion of the inner surface is exposed. The exposed portions of the housing 212 heat quickly and then this heat is transferred rapidly to the drill mud when it is pushed on to these portions by the conveyor 218 (causing the moisture in the drill mud to evaporate). In this way, the accumulations 264 become drier the further they are conveyed along the housing 212.

Referring to FIG. 3A, a further embodiment of an apparatus 310 for removing moisture from sludge is shown. This embodiment has many features in common with the previously described embodiments.

Again, for the purposes of this description the sludge will be referred to as food waste (i.e. that has been created as a by-product of a food manufacturing process and requires treating), but it is emphasised that the apparatus is suitable for use with, and can be used for, many other types of sludge (e.g. by-products from process plants, sewage, slurry, recycled paper, etc.—generally any process in which sludge is created or requires treating).

As is the case with the previously described embodiments, the apparatus 310 comprises an elongate circular housing 312 having an inlet 314 and an outlet 316. The inlet 314 and outlet 316 are arranged for respective receipt and discharge of food waste being treated by the apparatus 310.

The apparatus 110 also comprises a hollow-shaft ribbon screw conveyor 318 located in the housing 312 to convey the food waste.

As illustrated in FIG. 3B, the blade 322 of the screw conveyor 318 comprises tear-drop shaped apertures 324 that, as discussed above, provide flow paths for air (and evaporated moisture) that is to be extracted from the housing 312. As opposed to previous embodiments, the aperture 324 are generally aligned along the housing 312. The incline of the housing 312 allows food waste to flow back along the screw conveyor 318 (through the apertures 324), which limits the volume of food waste that is caught between the flights of the screw conveyor 318 (as is shown in FIG. 2).

A steam jacket 326 is arranged around the housing 312 for heating the food waste. In previous embodiments the steam jacket 326 extended only partway around the housing 312 at the upper portion of the housing 312, but in the illustrated embodiment, the steam jacket 326 extends the entire way around the circumference of the housing 312.

The interior of the apparatus 310 is held at a pressure below atmospheric pressure by a vacuum pump located at an upper end of the housing 312 (but not shown). As in previous embodiments, the vacuum pump is arranged such that it extracts air from the housing 312 and, at the same time, extracts the evaporated moisture from the housing 312. Moisture and air is extracted by the vacuum pump through an opening 330 in the housing 312 located towards the outlet 316 of the housing 312. As is illustrated in FIGS. 3A and 3D, two pipes 366 are connected to the opening, and are configured such that they narrow from the opening 330. Thus, in use, velocity of the air (containing the evaporated moisture) increases from the location at which the opening 330 is located to a location at which the pipes 366 become narrower. As with the hood of the previous embodiments, the lower air velocity at the opening 330 may help to limit the quantity of dust carried by the air flowing through the opening and into the pipes (e.g. dust can drop out of the air).

As is clear from FIG. 3D, the pipes 366 are arranged such that they have a "bull-horn" configuration. In other words, each pipe 366 includes four bends at various orientations in proximity to the outlet 316, before being directed back along the apparatus 310 and joining into a single pipe (which is in turn connected to a condenser for condensing harvested moisture). Such an arrangement (i.e. the tortuosity of the path) can help to increase the presence of turbulence in the airflow, which can in turn help to facilitate condensation of the moisture in the extracted air.

The flights of the screw conveyor 318 are arranged to as to be variably spaced (i.e. along the length of the screw conveyor 318). In contrast to the previously described embodiments, the flights are closer together at the inlet than the outlet such that, in operation, the food waste is transported faster at the outlet 316 than at the inlet 314.

The slower movement of the drill mud as it is conveyed in the lower portion of the housing essentially allows more heat to by the drill mud so as to increase its temperature to boiling point. Once the drill mud (or the moisture contained within the drill mud) reaches boiling point and the moisture evaporates therefrom, further heating of the drill mud is generally not desirable. This is because heating drill mud that has minimal (or no) moisture can be a waste of energy (i.e. reducing the efficiency of the system). Secondly drill mud that has become too dry can be difficult to handle once it has dropped out of the housing and can cause dust, which may be a health and safety risk.

The housing and the screw conveyer 318 are inclined such that, in use, food waste accumulates 364 between each flight of the screw conveyor 318 and the housing 312 (i.e. the flights act as troughs. At any one time, a portion of the lower surface of the housing 312 between each accumulation 364 of food waste and the subsequent flight may be exposed 368 (i.e. the food waste does not cover this portion), which heats rapidly. The exposed portions 368 then transfer this heat to the drill mud as it is pushed onto them by the conveyor 318.

Figure 4:
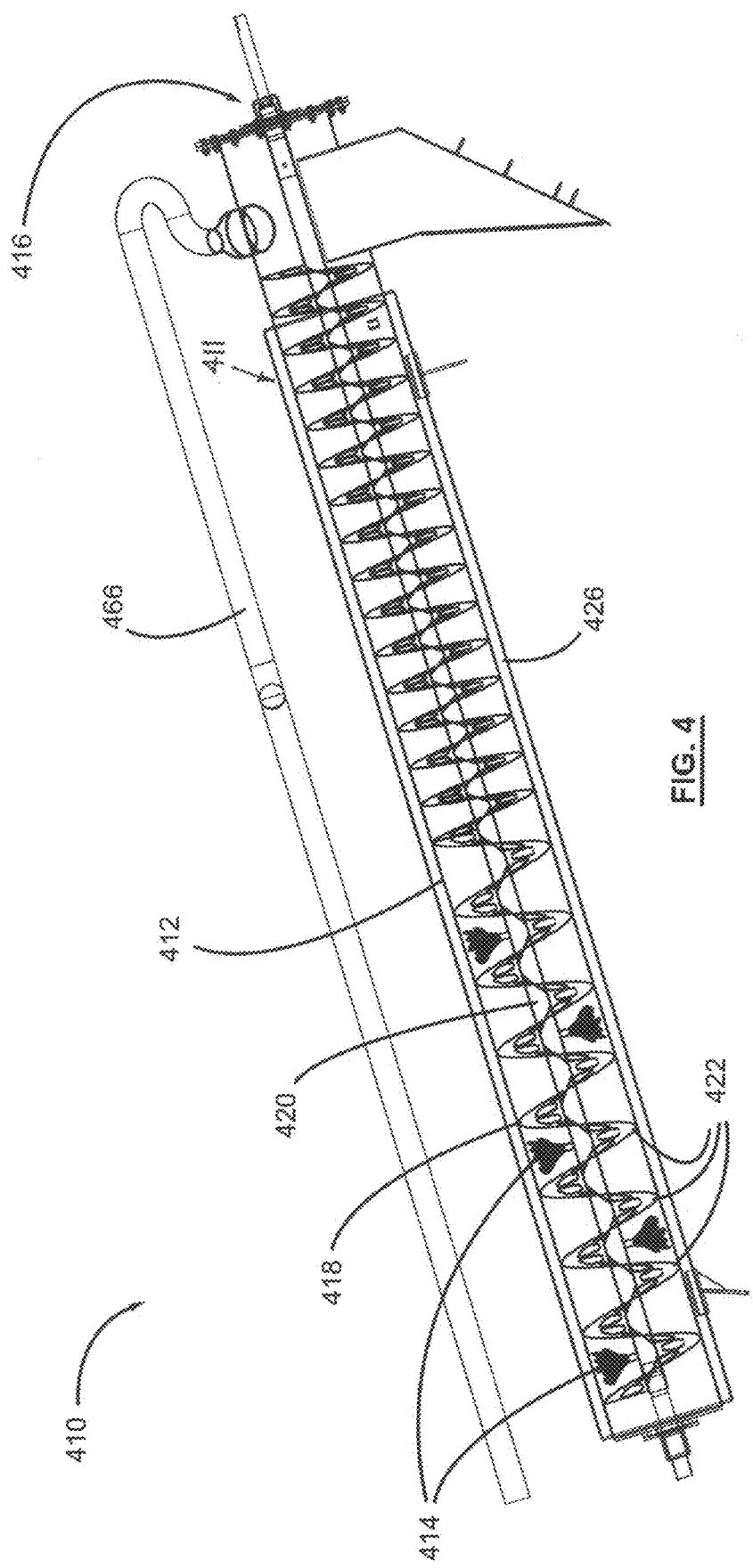
FIG. 4 shows a section view of a fourth embodiment of the apparatus as set forth in the Summary.

The inlet 314 is located at the lower end of the housing 312. Although not illustrated, the housing 312 can be arranged such that its lower end is submerged in a trough, bucket, container etc. of food waste. In this respect, the inlet 314 could alternatively be an open end of the housing 312. The inlet 314 may alternatively, or additionally, be arranged such that at least a portion of the food waste is sprayed (e.g. by passing it through a nozzle) into the housing 312 from the shaft of the conveyor. A similar embodiment is illustrated in FIG. 4, wherein the apparatus 410 comprises several inlets in the form of spray nozzles 414. The nozzles 414 are directed so as to spray sewage from the shaft 420 into the interior of the housing 412. This can effectively increase the surface area of the sewage as it enters the housing 412, thereby increasing heat transfer to, and evaporation of, the moisture in the sewage. The nozzles 412 may be arranged such that the sewage is sprayed into an interior area of the housing 412 having a high, or the highest, temperature.

Referring again to the embodiments shown in FIGS. 3A to E, a further part of the apparatus 310 is illustrated in FIG. 3E. This comprises a preheater 360 in the form of a preheat tank, through which drill mud is passed prior to entering the housing 312. The preheat tank comprises a heating coil that, whilst not shown in detail, forms part of the condensate return line containing condensate from the steam jacket 324. In other words, steam in the steam jacket 324 (provided by the boiler) is transferred back to the boiler via the preheat tank 360, which can increase the efficiency of the apparatus. In other forms, the heat for the preheat tank 360 may be provided by an additional boiler, burner etc.

Figure 5B:
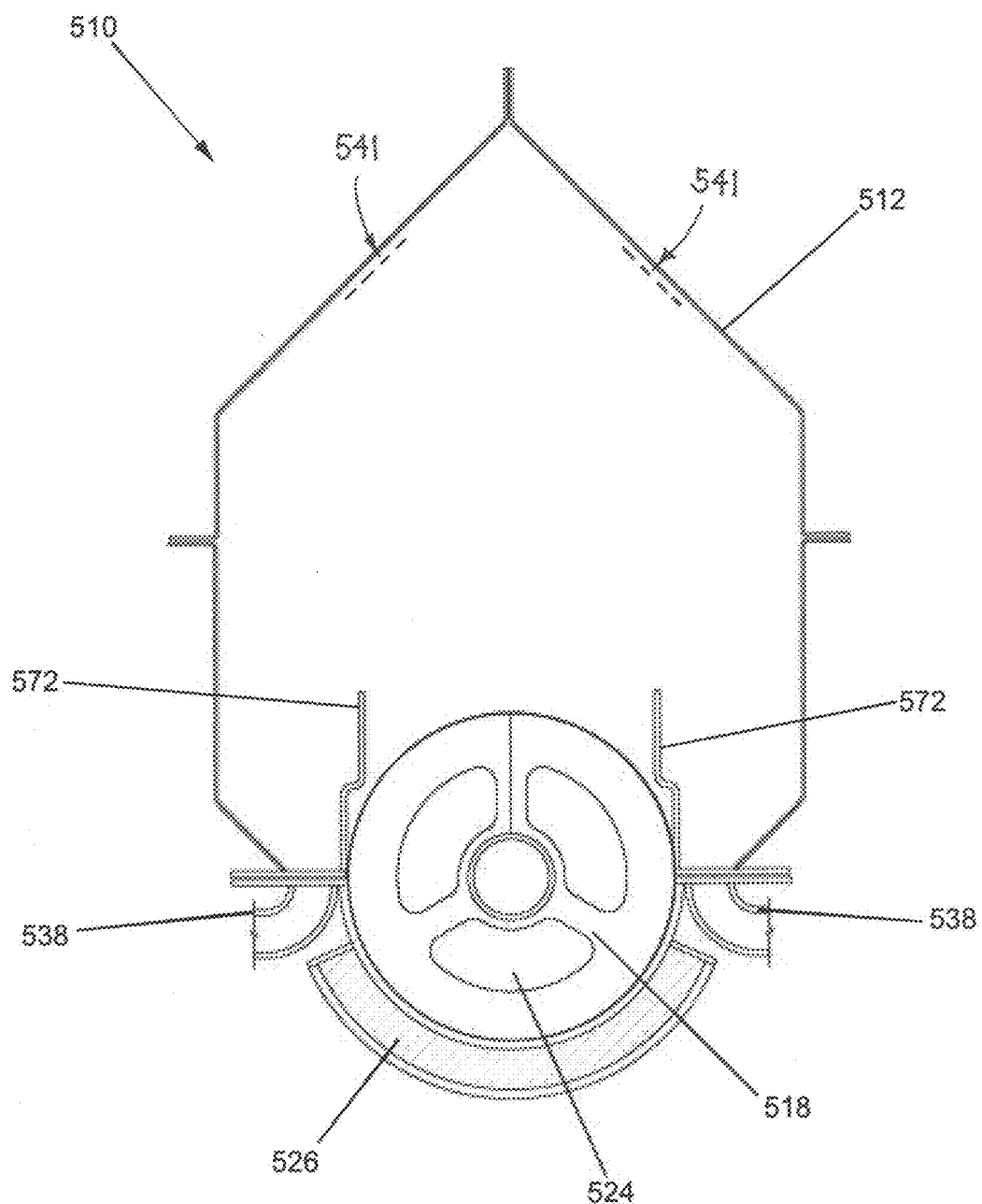
FIG. 5B shows a section view, perpendicular to the view shown in FIG. 5A, of an embodiment of the apparatus as set forth in the Summary.

Referring now to FIGS. 5A and 5B, a further embodiment of the apparatus is shown. This apparatus 510 further comprises a condenser 540 in the form of a condenser chamber attached to the housing 512, which is arranged such that evaporated moisture may condense therein. Such an arrangement may be less complex than the previously described embodiments and therefore may be suitable in circumstances where low cost is desired (i.e. maintenance and manufacturing costs) or skilled labour is not available (i.e. to operate complicated machinery). For example, it may be suitable for cleaning contaminated drinking water in developing countries.

The screw conveyor 518 extends past the housing 512 and into a condenser chamber 540. The condenser chamber 540 is in the form of a hood having a larger cross-sectional area than the housing 512. Whilst the walls of the condenser chamber 570 in the shown embodiment are generally flat, in other embodiments, the walls may be e.g. curved or corrugated (which can promote greater condensation and/or flow).

The evaporated moisture condenses on the walls 570 of the condenser chamber 540 and then flows down the walls 570 of the chamber due to gravity. This is in contrast to the apparatuses described above, whereby the moisture generally condenses after it has been extracted from the housing 512. The apparatus 510 also comprises condensate collection pipes 538 located at the lower end of the condenser chamber walls 570. Condensate that flows down the walls 570 of the condenser chamber 540 passes into and is collected by the condensate collection pipes 538. The inlets to the collection pipes 538 are separated from the screw conveyor 518 by guard walls 572 that are located either side of the screw conveyor 518. The guards 572 prevent contaminated water from entering the pipes 538, for example, due to splashing of the contaminated water caused by movement of the conveyor 518.

In the illustrated form, the condensate collection pipes 538 are connected to a header 554, such that the condensate from all of the pipes 538 is combined into a single flow in the header 554. Some of the condensate collected by the pipes 538 may be used to replenish the boiler (described in greater detail below with reference to FIG. 6). This may help to increase the efficiency of the system, and reduce the volume of water (i.e. external to the system) that must be used to replenish the boiler.

In this form, the vacuum pump is in the form of a blower 528 and is connected to the end of the header 554. The blower 528 is configured to exhaust air from the condenser chamber 540 via the pipes 538 and header 554, such that a negative pressure (i.e. below atmospheric pressure) is formed in the condenser chamber 540. This negative pressure helps to lower the boiling point of the contaminated water and thus reduces the heat required to evaporate the water. At the same time, the exhausting of air by the blower 528 facilitates flow of the condensate.

The apparatus 510 may further comprise flap valves 541, which open to allow air into the condenser chamber 540. This may also help to regulate the pressure in the condenser chamber 540, and the air that enters the condenser chamber 540 may cool the evaporated moisture (i.e. water vapour). This cooling may promote condensation of the evaporated moisture.

The flights of the screw conveyor 518 are spaced more closely in the housing 512 than in the condenser chamber 540. In use, this means that the contaminated water is conveyed more slowly through the housing 512 when it is being heated prior to entry into the chamber 512.

In the illustrated form the screw conveyer 518 and housing 512 are inclined. As set forth above, this facilitates rapid evaporation of the contaminated water, and in this case the rapid evaporation is especially prevalent as it enters the condenser chamber. The incline of the conveyor results in the lower section of the apparatus 510 (i.e. the housing 512) being submerged in contaminated water (i.e. when suitably configured) and an air space located in the higher sections of the apparatus (i.e. the condenser chamber 540), such that rapid evaporation of the water occurs at the upper surface thereof. The angle of incline may also help to separate or draw out the solids in the contaminated water.

Figure 6:
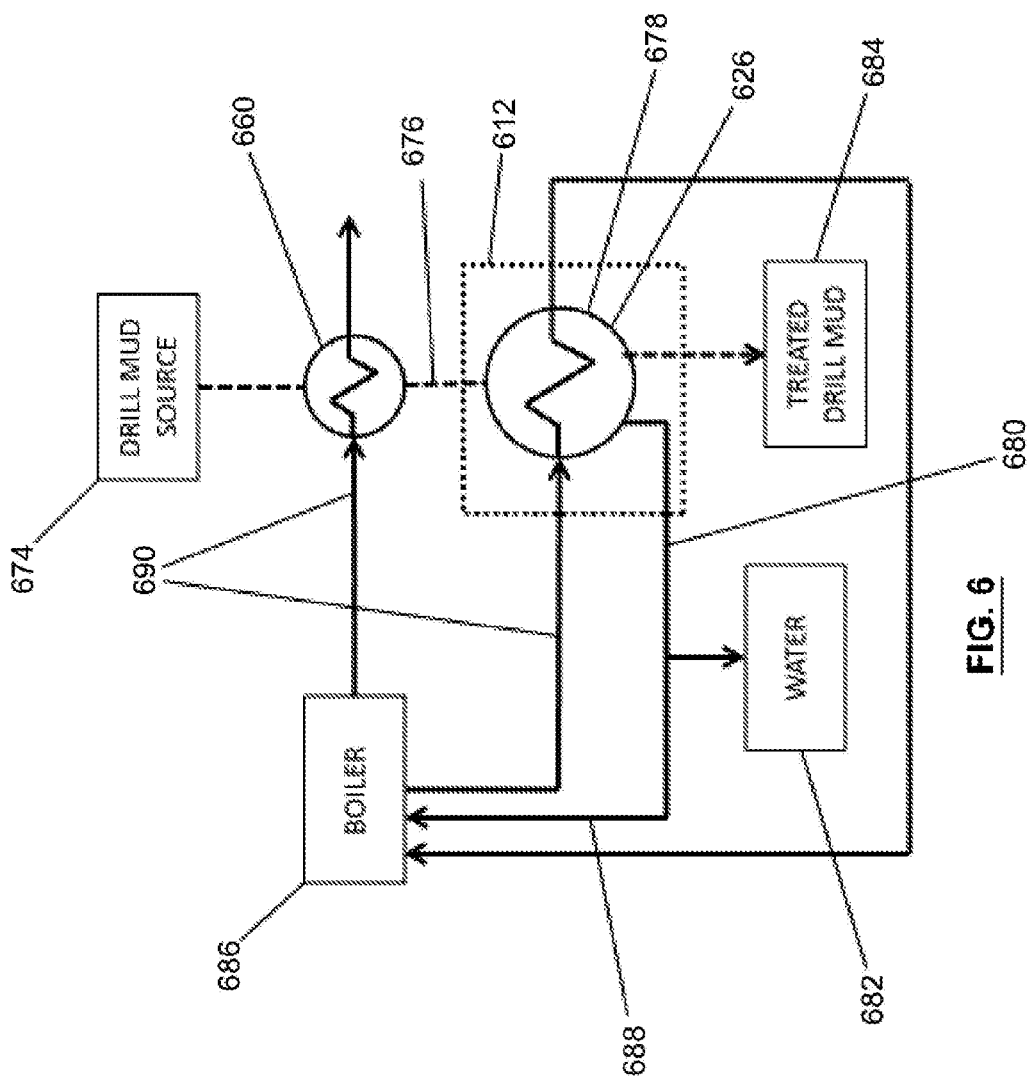
FIG. 6 shows a flow chart of an embodiment of the process as set forth in the Summary.

Referring now to FIG. 6, a process for treating sludge, in the form of drill mud, is schematically illustrated.

The drill mud source 674 may be, for example, a tank, a pipeline, a conveyor etc. In a first step the mud 674 is preheated by way of a preheater heat exchanger 660. In some cases, the drill mud 674 may be blended (i.e. mixed) with other drill mud (or other types of sludge) prior to entering the process. This may be done to adjust the consistency (or viscosity) of the drill mud to ensure optimum running of the process. The blending of the mud 674 can ensure that it is generally homogenous. This can facilitate optimisation of the system. When the drill mud 674 is sourced from e.g. a tank, the drill mud 674 may have settled in the tank such that a vertical viscosity gradient is present. Thus, mud 674 from appropriate lower parts and higher parts of the tank may be mixed in order to arrive at a suitable consistency for use in the apparatuses and process described herein.

Following this, the preheated mud is conveyed 676 in discrete accumulations on an incline and in a housing 612. Heat 678 from a steam jacket 626 indirectly heats the untreated mud, through the walls of the housing 612. Whilst a steam jacket 626 is described in this embodiment, the heat may alternatively be transferred by other means such as electric heating coils, burners, infra-red lamps, etc. The heat 678 increases the temperature of moisture in the preheated mud to its boiling point, such that the moisture evaporates 680. The speed of the conveyance of the mud and the temperature of the steam jacket can be adjusted to achieve a desired discharge mud viscosity. If the mud discharged from the system is too dry it may produce significant amounts of dust and present a health and safety risk. On the other hand, if the mud is too wet it can stick to surfaces and present maintenance and operation issues.

The evaporated moisture 680 is condensed and collected 682, such that it can be removed from the system. Although not shown, the process can further comprise a heat exchange between the (hot) evaporated moisture 680 and the (cool) drill mud from the drill mud source 674, which can facilitate condensing of the moisture 680 (and at the same time begin to heat the drill mud 674). This can increase the efficiency of the process. The treated mud 684 (i.e. the mud with moisture removed therefrom) is discharged and removed from the system.

The evaporated moisture 680 has a lower salt concentration than the drill mud. Accordingly, the condensed and collected moisture 682 may be suitable for re-use (e.g. irrigation water, cooling water, cleaning water, etc). Similarly, and as set forth above, additives in the drill mud may be broken down by the heat in the apparatus, thereby rendering the treated mud suitable for landfill, mixing with road materials etc.

A partial vacuum is maintained in the housing 612, in order to reduce the boiling point of the moisture contained in the preheated drill mud. This reduces the heat 678 required in order to evaporate the moisture. The partial vacuum is maintained by a pump or blower (not shown). The pump or blower also facilitates the flow of water that has been condensed 682.

The steam in the steam jacket 626 is provided by a boiler 686. In use, some water may be lost from the steam system and, as such, the system will need to be replenished. To facilitate this, some of the condensate 688 is recycled to replenish the boiler 686 instead of being removed. This can increase the efficiency of the process and reduce its overall water needs. Further, the condensate can be hot (i.e. heated by the apparatus) when it enters the boiler 686. Ordinarily top-up water would be at outside/room temperature. That the condensate 688 is at a high temperature means that it requires less energy to return it to steam for the steam jacket 626. The condensate 688 is also clean (i.e. most or all of the impurities are left in the drill mud) which means that, when used in the boiler 686, it can also result in less scale than other water sources. This can reduce maintenance costs. This may be especially beneficial, for example, if the process is used in areas having low water availability.

In the illustrated form, steam 690 from the boiler 686 is passed through the heat exchanger 626 (in addition to the steam 690 passing to the steam jacket) to heat 678 the drill mud during the preheating phase. This can increase the efficiency of the process by decreasing the quantity of heat 678 required to be transferred to the drill mud from the steam jacket 626 in order to evaporate the moisture. Alternatively or additionally, exhaust gases may be used to heat the drill mud in the preheat heat exchanger. The boiler may also incorporate an economiser that, for example, uses the exhaust gases of the boiler to preheat condensate (from the steam line) re-entering the boiler.

Figure 7:
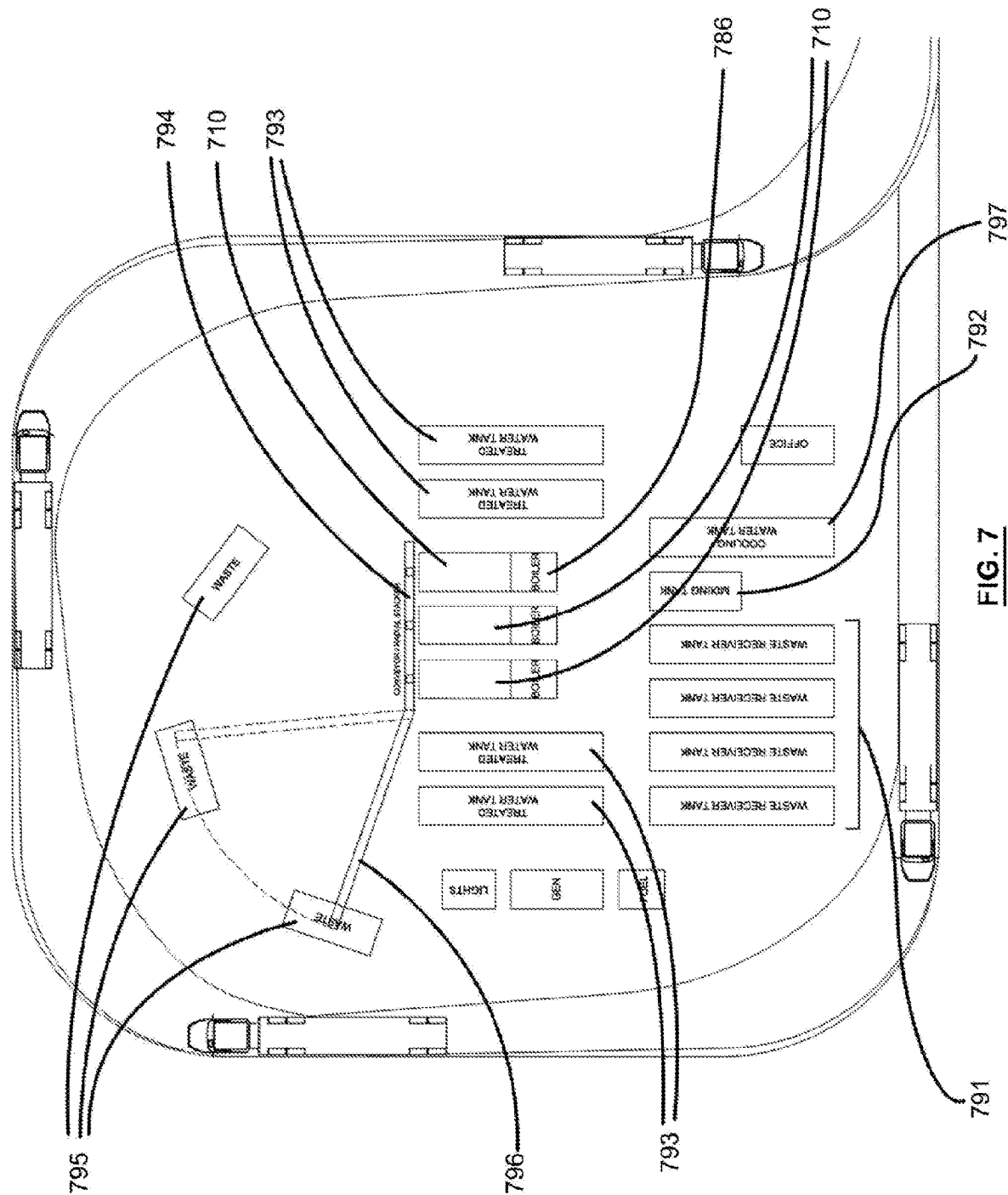
FIG. 7 shows a plan view of a site layout incorporating the apparatus as set forth in the Summary.

FIG. 7 is an example site plan layout comprising several apparatuses 710 that may be, for example, of the type that are illustrated in FIGS. 1 to 5 and described above. The discharge of the units 710 may be cycled such that a continuous flow of processed drill mud is provided (e.g. whereby no two units are stopped at one time). In other words, each unit 710 may be operated independently of the other units 710 and asynchronously. Connected to each unit 710 is a boiler 786, which provides steam to its respective unit 710. The waste (e.g. drill mud) is unloaded from the trucks into waste receiver tanks 791. The waste could otherwise be supplied directly (e.g. by pipeline) from an environmental pond, dam, etc. The waste is then transferred (e.g. via pipes that are not shown) to a mixing tank 792, where it is mixed in order to ensure optimum consistency for use in the units. The units 710 process the waste whereby water is extracted and transferred to treated water tanks 793. The treated waste is discharged onto a conveyor 794, which then conveys the treated waste to waste containers 795 via a radial stacker 796. The waste is then collected by the trucks 792 to be used as e.g. landfill, mine remediation, etc. A tank of cooling water 797 is also provided. The cooling water may be used in the units 710 to facilitate condensing of the evaporated moisture. As is clear from the description above, and FIG. 7, the site plan and corresponding process is such that drill mud may be substantially continuously treated (rather than in batches, as is provided in the prior art).

Although not shown in the Figures, the apparatus may be controlled by a controller in the form of a control unit that may be located on the apparatus, or alternatively, located remotely from the apparatus. The control unit may allow for monitoring and control of one or more of the parameters found in Table 1. The control unit can control various PID controllers in desired sequences in accordance with the sludge being treated. The control unit can also receive signals from various probes and meters (e.g. temperature, pressure, moisture, flow, etc. probes and meters).

The control unit can provide computer or programmed control of parameters so that the system as a whole can be optimised whilst in use. For example, if the circumstances are such that water availability is high and water is not a process-limiting factor (i.e. the boiler does not require that at least some collected water be recycled to the boiler) then the control unit may increase the rate of treatment for faster processing of drill mud.

TABLE 1

CONTROL OF PARAMETERS

| Parameter | Description |
|---|---|
| Heat levels | Several checks around the unit may be taken to gauge the operational temperature of the unit, and its surrounding area, including atmospheric temperature. These may help to build a picture of the expected operation of the unit during different times of the day and assist for optimising operation. This may also help establish parameters for heat shielding, or whether the use of insulation is required. |
| Time to reach evaporation point | This may be recorded by a temperature gauge, or a sensor detecting whether condensate is collecting in the storage tank. |

TABLE 1-continued

CONTROL OF PARAMETERS

| Parameter | Description |
|---|---|
| Rate of condensate collection or rate of processing waste | This may be measured by a comparison of the volume of collected moisture (i.e. removed from the sludge) with the volume of the original product. For example, condensate collection in litres per hour may be measured. |
| Quality of condensate | Such a measurement may be performed by optical means. This may make it possible to determine the useability of the collected moisture. This can also be measured and recorded by a range of sensors (e.g. sensing turbidity, pH, etc.) and a data logger. |
| Amount of product remaining | This may be in the form of a weight measurement of the material that exits the housing, and/or a volume measurement. The volume may be used to determine the handling requirements for the bi-product. The weight may help to determine how the quantity of sludge that has been evaporated. |
| Consistency/Characteristics of product | This may be determined by content (viscosity) and density of the product before, and after treatment. It would be useful in gauging appropriate auger speeds needed relative to the initial product. A trained person may also be able to visually gauge the consistency and characteristics of the product. |
| Fuel Usage | A record of the quantity of fuel used during each cycle may help to determine the cost effectiveness of the unit. |
| Noise Levels | A check of the noise levels may ensure that the noise is kept within any relevant noise regulations. |

Whilst a number of apparatus and process embodiments have been described, it should be appreciated that the apparatus and process may be embodied in many other forms.

For example, the heater of the process and apparatus is generally described in the form of a boiler. However, a person of ordinary skill in the art would understand that another suitable means for heating may be used, such as infrared heating or electric heating elements that transfer heat to the sludge via radiation.

Further, whilst the apparatus and process have generally been described for use with drill mud, they are also suitable for the removal of moisture from other types of sludge. In this respect, the inclination, speed and (in the case the conveyor is a screw conveyor) the flight spacing, can all be adjusted to tailor the apparatus or process to various types of sludge having a range of compositions and viscosities. Other variables may also be adjusted, such as the heat input and the size and shape of the housing.

In the illustrated embodiments, the housing is elongate and generally circular in cross-section; however in other forms the housing may have a rectangular, triangular, ovoid etc. cross-sectional shape. The housing may be somewhat dictated by the type of conveyor used in the housing. For example, a rectangular housing may be more suitable for a bucket or belt-type conveyor. The housing may be formed of e.g. stainless steel, mild steel, brass, copper, aluminium, etc.

Further, the conveyors illustrated and shown above each have a single blade. A person of skill in the art would understand that a screw conveyor providing the same (or similar) function may take many other forms and may, for example, comprise multiple (i.e. helical or otherwise) blades, paddles, etc.

Components of the apparatus, such as the housing and conveyor, may be made of other materials than as described above. A person of ordinary skill in the art would understand that these components may be made of other suitable materials and that a suitable surface treatment may be applied to these components to improve their properties (e.g. durability, heat resistance etc.).

Example

A treatment unit transported to, and setup at, a mine site. The treatment unit included three inclined drill mud treatment apparatuses supported on a single skid and powered by a diesel generator.

Drill mud was extracted from a drill mud pit and transferred to a tank located in proximity to the treatment unit. The treatment unit was connected by pipe to the tank such that drill mud from the tank flowed into the individual apparatuses of the treatment unit. The general properties of the drill mud are provided in Table 2.

TABLE 2

PROPERTIES OF EXEMPLARY PRE-TREATED DRILL MUD

| Property | Unit | Value Range |
|---|---|---|
| Conductivity | us/cm | 25,000-35,000 |
| Total Dissolved Solids | mg/L | 20,000-30,000 |
| pH | pH | 6-8 |
| Sodium Adsorption Ratio | ratio | 25-35 |
| Total Suspended Solid | mg/L | 100-200 |
| Total Petroleum Hydrocarbons | mg/L | 5-6 |

The apparatuses were operated simultaneously and controlled by a control unit. Each apparatus received a portion of the drill mud from the drill mud tank. In each apparatus, the drill mud was intermittently conveyed along the housing of the apparatus by a screw conveyor. Each conveyor was repeatedly rotated in a first direction, rotated in a second opposite direction and then paused. The housing was heated by a steam jacket, which caused moisture (i.e. water) in the drill mud to evaporate. The moisture was extracted by multiple vacuum pumps and condensed in a heat exchanger and a plurality of condensers. The condensate was collected and the properties of the condensate were measured. These values are shown in Table 3.

TABLE 3

PROPERTIES OF COLLECTED CONDENSATE

| Property | Unit | Value Range |
|---|---|---|
| Conductivity | us/cm | 100-200 |
| Total Dissolved Solids | mg/L | 50-150 |
| pH | pH | 7-8 |
| Sodium Adsorption Ratio | ratio | 1-5 |
| Total Suspended Solid | mg/L | 1-10 |
| Total Petroleum Hydrocarbons | mg/L | 1-2 |

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the apparatus and process for the removal of water from sludge as disclosed herein.

What is claimed is:

1. A process for removing moisture from sludge, the process comprising the steps of:
    conveying the sludge on an incline through a housing; and
    heating the sludge as it is conveyed on the incline to evaporate moisture in the sludge to thereby produce an airflow comprising the evaporated moisture; and
    introducing a separate flow of outside air into the airflow comprising the evaporated moisture, the flow of outside air being introduced separately to a discharge of sludge from the housing; and
    condensing the evaporated moisture, whereby the separate flow of outside air introduced into the airflow facilitates the condensing of the moisture.

2. A process as claimed in claim 1 wherein the sludge is conveyed in the form of discrete accumulations.

3. A process as claimed in claim 1 wherein a partial vacuum is maintained in the housing whilst the sludge is conveyed therethrough.

4. A process as claimed in claim 1 wherein the conveying is in the form of intermittent movement of the sludge.

5. A process as claimed in claim 1 further comprising the step of passing the sludge through a nozzle to atomise the sludge prior to conveying it through the housing.

6. A process as claimed in claim 1 further comprising the step of collecting the evaporated moisture prior to condensing the evaporated moisture.

7. A process as claimed in claim 1 wherein the condensing is facilitated by cooled water that has been harvested from the sludge using the process.

8. A process as claimed in claim 1 further comprising preheating the sludge prior to conveying it through the housing.

9. A process as claimed in claim 8, wherein the preheating is performed as a generally isometric process such that the pressure of the sludge is increased by the preheating.

10. A process as claimed in claim 9 wherein, following the preheating, the sludge is driven into the housing by a differential pressure between the sludge and the interior of the housing.

11. A process as claimed in claim 1, wherein the speed of the conveying of the sludge varies along the housing.

12. A process as claimed in claim 1 wherein the condensing of the evaporated moisture is performed in fluid communication with the housing.

13. A process as claimed in claim 1 wherein the separate flow of outside air is introduced into the housing.

14. A process as claimed in claim 1 wherein the separate flow of outside air is introduced into a condenser chamber.

15. A process as claimed in claim 1 wherein the separate flow of outside air is introduced into a condenser header.

16. An apparatus for removing moisture from sludge, the apparatus comprising:
    a housing having an inlet and outlet for respective receipt and discharge of the sludge;
    a conveyor located in the housing and configured to transport the sludge on an incline between the inlet and the outlet; and
    a heater to heat the sludge to remove moisture therefrom as an airflow comprising the evaporated moisture whilst the sludge is being transported by the conveyor on the incline; and
    an air inlet that is separate from the heater and from the sludge outlet, the air inlet arranged to introduce a separate flow of outside air into the airflow comprising the evaporated moisture; and
    a condenser in fluid communication with the housing to condense the evaporated moisture from the airflow that is produced by heating of the sludge.

17. An apparatus as claimed in claim 16 further comprising a vacuum device arranged to extract air from the apparatus and, at the same time, to cause the moisture removed from the sludge to flow therefrom together with the extracted air.

18. An apparatus as claimed in claim 16, wherein at least an upper surface of the housing interior is inclined and the outlet is located at or adjacent to an upper most part of the housing.

19. An apparatus as claimed in claim 16, wherein the heater comprises a steam jacket located to at least partially surround the housing so as to heat the sludge as it passes therethrough.

20. An apparatus as claimed in claim 16, wherein the conveyor comprises flights so as to be able to convey the sludge in discrete accumulations.

21. An apparatus as claimed in claim 16, further comprising a preheater to preheat the sludge prior to it passing into the housing inlet.

22. A system for removing moisture from sludge, the system comprising: an apparatus as defined in claim 16; and a controller for monitoring and adjusting one or more of the following parameters in relation to the apparatus: heat levels; time to reach evaporation point; rate of condensate collection or rate of processing waste; quality of condensate; amount of product remaining; consistency or characteristics of product; fuel usage, and noise levels.

23. An apparatus as claimed in claim 16, wherein the air inlet comprises an inlet to the housing at a location that is separate from the sludge outlet of the housing.

24. An apparatus as claimed in claim 16, wherein the air inlet comprises an air inlet to a condenser chamber that is separate from the housing.

25. An apparatus as claimed in claim 16, wherein the air inlet comprises an air inlet to a condenser header that is separate from the housing.

* * * * *